(12) United States Patent
Kim et al.

(10) Patent No.: US 10,088,945 B2
(45) Date of Patent: Oct. 2, 2018

(54) MOBILE TERMINAL AND METHOD FOR CONTROLLING THE SAME

(71) Applicant: LG ELECTRONICS INC., Seoul (KR)

(72) Inventors: Soomin Kim, Seoul (KR); Yongchul Shin, Seoul (KR); Yong Kim, Seoul (KR); Jiyoung Hong, Seoul (KR); Jinhae Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 104 days.

(21) Appl. No.: 15/235,512

(22) Filed: Aug. 12, 2016

(65) Prior Publication Data

US 2017/0046556 A1 Feb. 16, 2017

(30) Foreign Application Priority Data

Aug. 13, 2015 (KR) .................. 10-2015-0114773

(51) Int. Cl.
| | |
|---|---|
| *G06F 3/00* | (2006.01) |
| *G06F 3/041* | (2006.01) |
| *G06F 3/0488* | (2013.01) |
| *G06F 3/0482* | (2013.01) |
| *G06F 3/0487* | (2013.01) |
| *G06F 21/32* | (2013.01) |
| *G06K 9/00* | (2006.01) |

(52) U.S. Cl.
CPC .......... *G06F 3/0416* (2013.01); *G06F 3/0482* (2013.01); *G06F 3/0487* (2013.01); *G06F 3/04883* (2013.01); *G06F 21/32* (2013.01); *G06K 9/00006* (2013.01); *H04M 2250/12* (2013.01)

(58) Field of Classification Search
CPC .... G06F 3/0416; G06F 21/32; G06F 3/04883; G06F 3/0487; G06F 3/0482; H04M 2250/12; G06K 9/00
See application file for complete search history.

(56) References Cited

U.S. PATENT DOCUMENTS

| | | | |
|---|---|---|---|
| 8,917,158 B2* | 12/2014 | Bong | G06F 3/016 340/5.53 |
| 2008/0042983 A1* | 2/2008 | Kim | G06F 3/03547 345/173 |
| 2015/0130738 A1* | 5/2015 | Park | G06F 3/1446 345/173 |

(Continued)

*Primary Examiner* — Muhammad N Edun
(74) *Attorney, Agent, or Firm* — Lee, Hong, Degerman, Kang & Waimey

(57) ABSTRACT

In a mobile terminal, in a case in which biometric information is input together The mobile terminal includes a touch screen configured to output screen information corresponding to a specific function, a sensor configured to sense biometric information of a user in a state in which the screen information is output, and a controller configured to control the touch screen to change the screen information on the basis of a touch applied to the touch screen, wherein when the biometric information is sensed by the sensor while the touch is applied, the controller may control the touch screen to output additional information related to the specific function on the basis of the biometric information, together with changing the screen information.

20 Claims, 17 Drawing Sheets

(56) References Cited

U.S. PATENT DOCUMENTS

| | | | |
|---|---|---|---|
| 2016/0034148 A1* | 2/2016 | Wilson | G06F 3/04842 715/835 |
| 2016/0034152 A1* | 2/2016 | Wilson | G06F 3/04845 715/835 |
| 2017/0245017 A1* | 8/2017 | Chaudhri | H04N 21/47205 |

* cited by examiner

MOBILE TERMINAL AND METHOD FOR CONTROLLING THE SAME

CROSS-REFERENCE TO RELATED APPLICATION

Pursuant to 35 U.S.C. § 119(a), this application claims the benefit of earlier filing date and right of priority to Korean Application No. 10-2015-0114773, filed on Aug. 13, 2015, the contents of which is incorporated by reference herein in its entirety.

BACKGROUND OF THE INVENTION

1. Field of the Invention

The present disclosure relates to a mobile terminal for sensing biometric information of a user and a method for controlling the same.

2. Background of the Invention

Terminals may be generally classified as mobile/portable terminals or stationary terminals according to their mobility. Mobile terminals may also be classified as handheld terminals or vehicle mounted terminals according to whether or not a user can directly carry the terminal.

Mobile terminals have become increasingly more functional. Examples of such functions include data and voice communications, capturing images and video via a camera, recording audio, playing music files via a speaker system, and displaying images and video on a display. Some mobile terminals include additional functionality which supports game playing, while other terminals are configured as multimedia players. More recently, mobile terminals have been configured to receive broadcast and multicast signals which permit viewing of content such as videos and television programs.

As functions of terminals become more diversified, terminals are implemented in the form of a multimedia player including composite functions such as capturing images or video, reproducing music or video files, playing games, receiving broadcast signals, and the like.

In order to support and increase functions of terminals, improvement of structural parts and/or software parts of terminals may be taken into consideration.

Meanwhile, as functions that may be executed in terminals are diversified, there is a limitation in providing an interface desired by users only with basic inputs such as a touch or a push. Also, as pieces of information that may be utilized in terminals are diversified, users should output pieces of information through a complicated process to use his or her desired information in executing any one function, experiencing inconvenience.

SUMMARY OF THE INVENTION

Therefore, an aspect of the detailed description is to provide a mobile terminal capable of conveniently using various interfaces by utilizing biometric information of a user in inputting a control command, and a method for controlling the same.

To achieve these and other advantages and in accordance with the purpose of this specification, as embodied and broadly described herein a mobile terminal comprising: a touch screen capable of outputting screen information; a sensor capable of sensing biometric information of a user; and a controller capable of controlling the touch screen and the sensor and configured to cause the touch screen to: display first information corresponding to a specific function; display second information related to the specific function in response to a touch input received via the touch screen while the first information is displayed; and display third information related to the specific function in addition to or instead of the second information in response to the biometric information sensed via the sensor while the touch input is received, wherein the second information and the third information are displayed concurrently on the touch screen when the third information is displayed in addition to the second information.

In an embodiment of the present disclosure, the third information is related to at least one of: usage pattern information with regard to execution of the specific function; or preset personal information associated with the user.

In an embodiment of the present disclosure, the usage pattern information includes at least one of: information regarding a number of times and a length of period that a sub-menu associated with the specific function has been used; information regarding a change pattern of information that is displayed while the specific function is executed; or information regarding a different function that is executed together with the specific function while the specific function is executed.

In an embodiment of the present disclosure, the biometric information includes fingerprint information; and the fingerprint information is at least one of: fingerprint information corresponding to a finger used to apply the touch input; or fingerprint information corresponding to a finger that is in contact with a designated area of the mobile terminal.

In an embodiment of the present disclosure, the controller is further configured to monitor whether the fingerprint information corresponding to the finger that is in contact with the designated area of the mobile terminal is continuously sensed via the sensor while the third information is displayed.

In an embodiment of the present disclosure, the controller is further configured to cause the touch screen to: maintain the displaying of the third information while the fingerprint information corresponding to the finger that is in contact with the designated area of the mobile terminal is continuously sensed; and stop the displaying of the third information when the fingerprint information corresponding to the finger that is in contact with the designated area of the mobile terminal is no longer sensed.

In an embodiment of the present disclosure, the controller is further configured to: recognize both the fingerprint information corresponding to the finger used to apply the touch input and the fingerprint information corresponding to the finger that is in contact with the designated area of the mobile terminal; and cause the touch screen to display the third information at an area of the touch screen to which the touch input is received.

In an embodiment of the present disclosure, the controller is further configured to: determine whether the biometric information sensed by the sensor matches preset biometric information; and cause the touch screen to display the third information differently based on a result of the determination.

In an embodiment of the present disclosure, the controller is further configured to cause the touch screen to: display preset personal information associated with the user as the third information when the sensed biometric information matches the preset biometric information; and display usage pattern information with regard to execution of the specific function as the third information when the sensed biometric information does not match the preset biometric information.

In an embodiment of the present disclosure, the controller is further configured to cause the touch screen to: display first usage pattern information with regard to execution of the specific function when the sensed biometric information matches the preset biometric information; and display second usage pattern information with regard to execution of the specific function when the sensed biometric information does not match the preset biometric information.

In an embodiment of the present disclosure, the first usage pattern information and the second usage pattern information are generated based on information regarding a different function that is executed concurrently with the specific function; the first usage pattern information is execution information according to execution of the different function; and the second usage pattern information is list information regarding the different function.

In an embodiment of the present disclosure, the controller is further configured to: determine whether the sensed biometric information matches preset biometric information to display the third information; and cause the touch screen to enter a locked state in which reception of a touch input via the touch screen is restricted when the sensed biometric information does not match the preset biometric information.

In an embodiment of the present disclosure, the controller is further configured to: determine whether follow-up biometric information sensed by the sensor matches the preset biometric information; cause the touch screen to display the third information when the sensed follow-up biometric information matches the preset biometric information; and cause the touch screen to enter a deactivated state in which lighting of the touch screen is turned off when the sensed follow-up biometric information does not match the preset biometric information.

In an embodiment of the present disclosure, further comprising a memory, wherein the controller is further configured to: recognize biometric information sensed by the sensor along with a specific touch input received via the touch screen while specific information is displayed via the touch screen; and cause the memory to store the specific information in association with the recognized specific touch input and biometric information.

In an embodiment of the present disclosure, the controller is further configured to: recognize the sensed biometric information as the biometric information associated with the stored specific information; and cause the touch screen to display the specific information as the third information in response to the biometric information that is sensed while the touch input is received.

To achieve these and other advantages and in accordance with the purpose of this specification, as embodied and broadly described herein, a mobile terminal may include: a touch screen configured to output screen information corresponding to a specific function; a sensor configured to sense biometric information of a user in a state in which the screen information is output; and a controller configured to control the touch screen to change the screen information on the basis of a touch applied to the touch screen, wherein when the biometric information is sensed by the sensor while the touch is applied, the controller may control the touch screen to output additional information related to the specific function on the basis of the biometric information, together with changing the screen information.

In an embodiment of the present disclosure, the additional information may be related to at least one of usage pattern information of the user formed in relation to execution of the specific function and preset personal information.

In an embodiment of the present disclosure, the usage pattern information of the user may include at least one of information a usage number and a usage period of a sub-menu included in the specific function, information regarding a change pattern of the screen information while the specific function is being executed, and information regarding a different function executed together with the specific function.

In an embodiment of the present disclosure, the biometric information may include fingerprint information, and the fingerprint information may be at least one of fingerprint information corresponding to a finger that applies the touch and fingerprint information corresponding to a finger that comes into contact with a specific region of a main body of the mobile terminal.

In an embodiment of the present disclosure, the controller may control the touch screen to change an output state of the additional information according to whether fingerprint information corresponding to the finger in contact with the specific region of the main body of the mobile terminal is sensed after the additional information is output.

In an embodiment of the present disclosure, the controller may maintain output of the additional information while the fingerprint information is sensed from the specific region, and may control the touch screen such that the additional information disappears when the fingerprint in formation is not sensed.

In an embodiment of the present disclosure, in a case in which fingerprint information corresponding to the finger that applies the touch and fingerprint information corresponding to the finger in contact with the specific region of the main body of the mobile terminal are sensed together, the controller may control the touch screen to output the additional information to a region corresponding to a point of the touch screen to which the touch has been applied.

In an embodiment of the present disclosure, the controller may determine whether the biometric information sensed by the sensor matches preset biometric information, and control the touch screen to output different additional information on the basis of the determination result.

In an embodiment of the present disclosure, in a case in which it is determined that the biometric information matches the preset biometric information, the controller may control the touch screen to output preset personal information as the additional information, and in a case in which it is determined that the biometric information does not match the preset biometric information, the controller may control the touch screen to output usage pattern information of the user formed in relation to execution of the specific function as the additional information.

In an embodiment of the present disclosure, in a case in which it is determined that the biometric information matches the preset biometric information, the controller may control the touch screen to output first usage pattern information of the user formed in relation to execution of the specific function, and in a case in which it is determined that the biometric information does not match the preset biometric information, the controller may control the touch screen to output second usage pattern information of the user formed in relation to execution of the specific function.

In an embodiment of the present disclosure, the controller may form the first usage pattern information and the second usage pattern information using by information regarding a different function executed together with the specific function, and the first usage pattern information may be execution information according to execution of the different function, and the second usage pattern information may be list information regarding the different function.

In an embodiment of the present disclosure, after the additional information is output, the controller may determine whether the biometric information matches the preset biometric information, and when it is determined that the biometric information does not match the preset biometric information, the controller may control the touch screen such that the screen information is switched to a locked state in which reception of a control command by a touch is limited.

In an embodiment of the present disclosure, in a case in which the biometric information is sensed again by the sensor, the controller may determine whether the sensed biometric information matches the preset biometric information, and in a case in which it is determined that the sensed biometric information does not match the preset biometric information, the controller may change the touch screen to a deactivated state in which lighting is turned off.

In an embodiment of the present disclosure, in a case in which the biometric information is sensed together with input of a specific control command while the specific function is being executed, the controller may store the specific control command and the biometric information in an associated manner.

In an embodiment of the present disclosure, in a case in which the biometric information sensed by the sensor, while the touch is being applied, is the biometric information associated with the specific control command, the controller may control the touch screen to output information associated with the specific control command, as the additional information.

To achieve these and other advantages and in accordance with the purpose of this specification, as embodied and broadly described herein, a method for controlling a mobile terminal may include: outputting screen information corresponding to a specific function on a touch screen; changing the screen information on the basis of a touch applied to the touch screen in a state in which the screen information is output; and when biometric information of a user is sensed while the touch is being applied, outputting additional information related to the specific function on the touch screen on the basis of the biometric information, together with changing the screen information.

In an embodiment of the present disclosure, the additional information may be related to at least one of usage pattern information of the user formed in relation to execution of the specific function and preset personal information.

In an embodiment of the present disclosure, the usage pattern information of the user may include at least one of information a usage number and a usage period of a sub-menu included in the specific function, information regarding a change pattern of the screen information while the specific function is being executed, and information regarding a different function executed together with the specific function.

In an embodiment of the present disclosure, the biometric information may include fingerprint information, and the fingerprint information may be at least one of fingerprint information corresponding to a finger that applies the touch and fingerprint information corresponding to a finger that comes into contact with a specific region of a main body of the mobile terminal.

In an embodiment of the present disclosure, the method may further include: changing an output state of the additional information, output on the touch screen, according to whether fingerprint information corresponding to the finger in contact with the specific region of the main body of the mobile terminal is sensed after the additional information is output.

According to the mobile terminal of an embodiment of the present disclosure, in addition to changing of screen information corresponding to a specific function in response to a touch applied in a state in which the screen information is output, in a case in which the touch is applied together with user's biometric information, additional information related to the specific function may be provided. Also, since the additional information is information reflecting a usage pattern of the user or personal information of the user formed in relation to the specific function, the user may quickly access information that he or she wants to use by simply inputting biometric information additionally, while executing the specific function, and here, several stages may be omitted.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention.

In the drawings.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well-known to one of ordinary skill in the relevant art has generally been omitted for the sake of brevity. The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
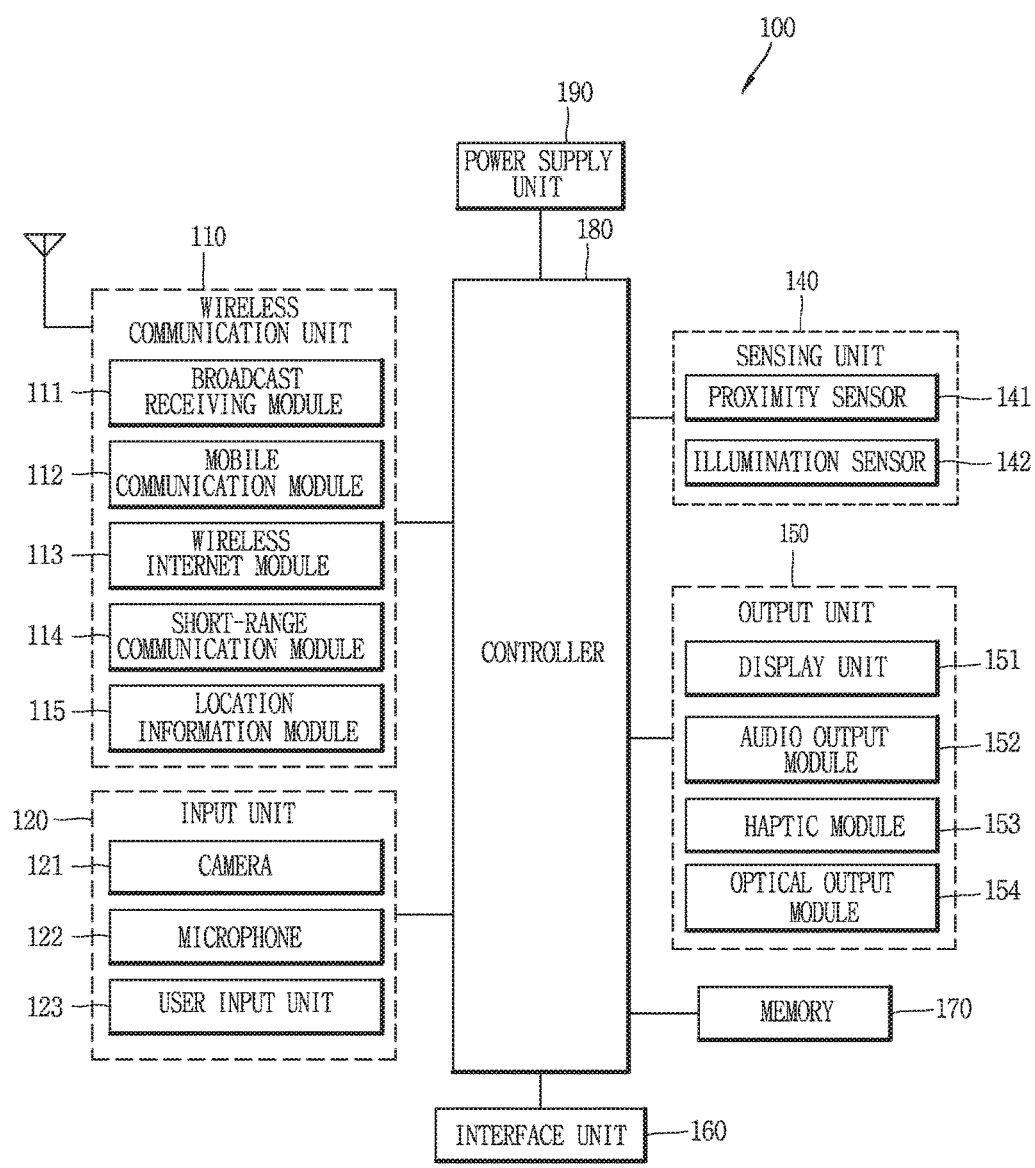
FIG. 1A is a block diagram illustrating a mobile terminal related to an embodiment of the present disclosure.
Figure 1B:
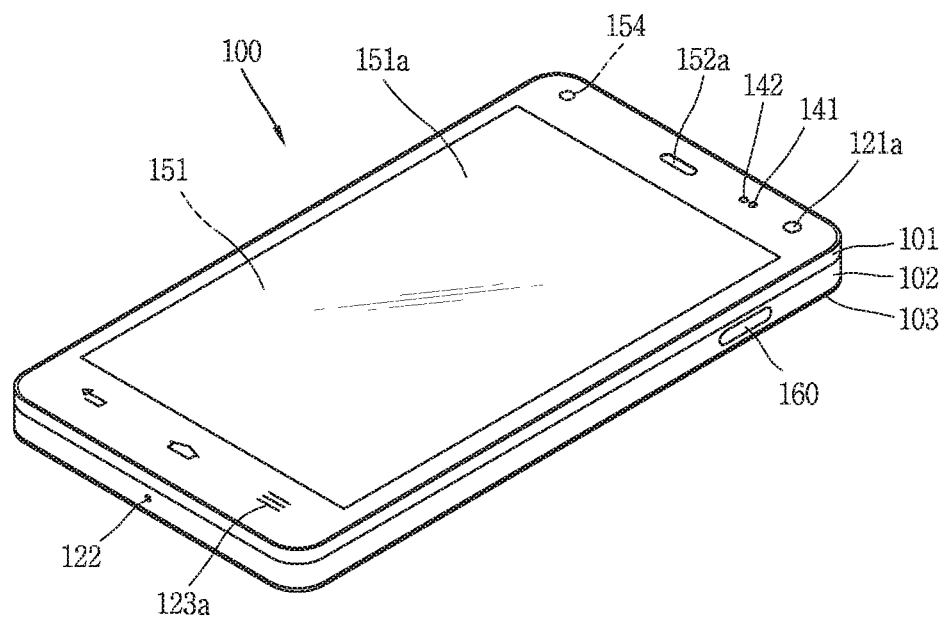
FIGS. 1B and 1C are conceptual views illustrating an example of a mobile terminal related to an embodiment of the present disclosure viewed in different directions.
Figure 1C:
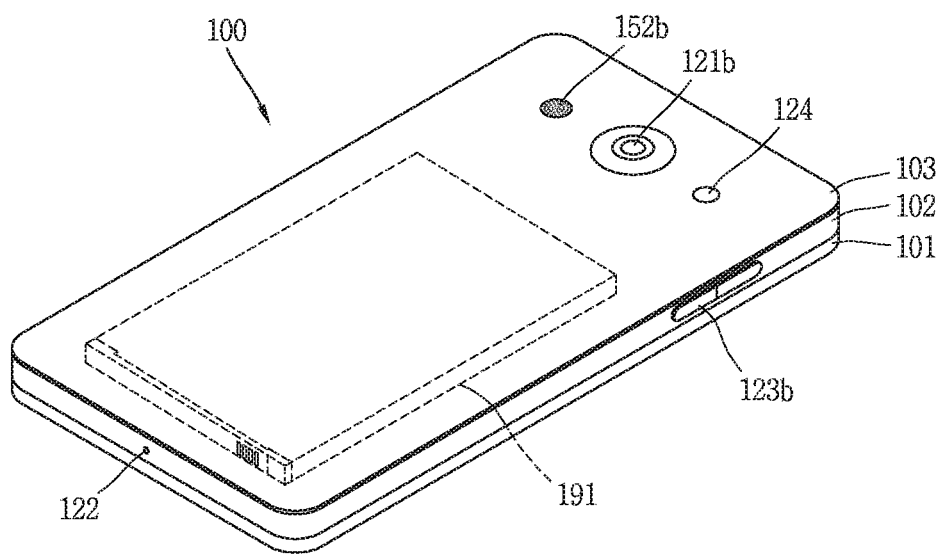

Reference is now made to FIGS. 1A-1C, where FIG. 1A is a block diagram of a mobile terminal in accordance with the present disclosure, and FIGS. 1B and 1C are conceptual views of one example of the mobile terminal, viewed from different directions.

The mobile terminal 100 is shown having components such as a wireless communication unit 110, an input unit 120, a sensing unit (or sensor) 140, an output unit 150, an interface unit 160, a memory 170, a control unit (or controller) 180, and a power supply unit 190. It is understood that implementing all of the illustrated components is not a requirement, and that greater or fewer components may alternatively be implemented.

The wireless communication unit 110 typically includes one or more modules which permit communications such as wireless communications between the mobile terminal 100 and a wireless communication system, communications between the mobile terminal 100 and another mobile terminal, communications between the mobile terminal 100 and an external server.

Further, the wireless communication unit 110 typically includes one or more modules which connect the mobile terminal 100 to one or more networks. To facilitate such communications, the wireless communication unit 110 includes one or more of a broadcast receiving module 111, a mobile communication module 112, a wireless Internet module 113, a short-range communication module 114, and a location information module 115.

The input unit 120 includes a camera 121 for obtaining images or video, a microphone 122, which is one type of audio input device for inputting an audio signal, and a user input unit 123 (for example, a touch key, a push key, a mechanical key, a soft key, and the like) for allowing a user to input information. Data (for example, audio, video, image, and the like) is obtained by the input unit 120 and may be analyzed and processed by control unit 180 according to device parameters, user commands, and combinations thereof.

The sensing unit 140 is typically implemented using one or more sensors configured to sense internal information of the mobile terminal, the surrounding environment of the mobile terminal, user information, and the like. For example, in FIG. 1A, the sensing unit 140 is shown having a proximity sensor 141 and an illumination sensor 142. If desired, the sensing unit 140 may alternatively or additionally include other types of sensors or devices, such as a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like), to name a few. The mobile terminal 100 may be configured to utilize information obtained from sensing unit 140, and in particular, information obtained from one or more sensors of the sensing unit 140, and combinations thereof.

The output unit 150 is typically configured to output various types of information, such as audio, video, tactile output, and the like. The output unit 150 is shown having a display unit 151, an audio output module 152, a haptic module 153, and an optical output module 154.

The display unit 151 may have an inter-layered structure or an integrated structure with a touch sensor in order to facilitate a touch screen. The touch screen may provide an output interface between the mobile terminal 100 and a user, as well as function as the user input unit 123 which provides an input interface between the mobile terminal 100 and the user.

The interface unit 160 serves as an interface with various types of external devices that can be coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). It is common for application programs to be stored in the memory 170, installed in the mobile terminal 100, and executed by the control unit 180 to perform an operation (or function) for the mobile terminal 100.

The control unit 180 typically functions to control overall operation of the mobile terminal 100, in addition to the operations associated with the application programs. The control unit 180 may provide or process information or functions appropriate for a user by processing signals, data, information and the like, which are input or output by the various components depicted in FIG. 1A, or activating application programs stored in the memory 170. As one example, the control unit 180 controls some or all of the components illustrated in FIGS. 1A-1C according to the execution of an application program that have been stored in the memory 170.

The power supply unit 190 can be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least some of the above components may operate in a cooperating manner, so as to implement an operation or a control method of a glass type terminal according to various embodiments to be explained later. The operation or the control method of the glass type terminal may be implemented on the glass type terminal by driving at least one application program stored in the memory 170.

Referring still to FIG. 1A, various components depicted in this figure will now be described in more detail.

Regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules 111 may be utilized to facilitate simultaneously receiving of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

Examples of wireless signals transmitted and/or received via the mobile communication module 112 include audio call signals, video (telephony) call signals, or various formats of data to support communication of text and multimedia messages.

The wireless Internet module 113 is configured to facilitate wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), HSUPA (High Speed Uplink Packet Access), Long Term Evolution (LTE), LTE-A (Long Term Evolution-Advanced), and the like. The wireless Internet module 113 may transmit/receive data according to one or more of such wireless Internet technologies, and other Internet technologies as well.

In some embodiments, when the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

In some embodiments, another mobile terminal (which may be configured similarly to mobile terminal 100) may be a wearable device, for example, a smart watch, a smart glass or a head mounted display (HMD), which is able to exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the control unit 180, for example, may cause transmission of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position of the mobile terminal. As an example, the location information module 115 includes a Global Position System (GPS) module, a Wi-Fi module, or both. If desired, the location information module 115 may alternatively or additionally function with any of the other modules of the wireless communication unit 110 to obtain data related to the position of the mobile terminal.

As one example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module.

The input unit 120 may be configured to permit various types of input to the mobile terminal 120. Examples of such input include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. In some cases, the cameras 121 may be arranged in a matrix configuration to permit a plurality of images having various angles or focal points to be input to the mobile terminal 100. As another example, the cameras 121 may be located in a stereoscopic arrangement to acquire left and right images for implementing a stereoscopic image.

The microphone 122 is generally implemented to permit audio input to the mobile terminal 100. The audio input can be processed in various manners according to a function being executed in the mobile terminal 100. If desired, the microphone 122 may include assorted noise removing algorithms to remove unwanted noise generated in the course of receiving the external audio.

The user input unit 123 is a component that permits input by a user. Such user input may enable the control unit 180 to control operation of the mobile terminal 100. The user input unit 123 may include one or more of a mechanical input element (for example, a key, a button located on a front and/or rear surface or a side surface of the mobile terminal 100, a dome switch, a jog wheel, a jog switch, and the like), or a touch-sensitive input, among others. As one example, the touch-sensitive input may be a virtual key or a soft key, which is displayed on a touch screen through software processing, or a touch key which is located on the mobile terminal at a location that is other than the touch screen. On the other hand, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like. The control unit 180 generally cooperates with the sending unit 140 to control operation of the mobile terminal 100 or execute data processing, a function or an operation associated with an application program installed in the mobile terminal based on the sensing provided by the sensing unit 140. The sensing unit 140 may be implemented using any of a variety of sensors, some of which will now be described in more detail.

The proximity sensor 141 may include a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

The proximity sensor 141, for example, may include any of a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and the like. When the touch screen is implemented as a capacitance type, the proximity sensor 141 can sense proximity of a pointer relative to the touch screen by changes of an electromagnetic field, which is responsive to an approach of an object with conductivity. In this case, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, control unit 180 processes data corresponding to proximity touches and proximity touch patterns sensed by the proximity sensor 141, and cause output of visual information on the touch screen. In addition, the control unit 180 can control the mobile terminal 100 to execute different operations or process different data according to whether a touch with respect to a point on the touch screen is either a proximity touch or a contact touch.

A touch sensor can sense a touch applied to the touch screen, such as display unit 151, using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the control unit 180. Accordingly, the control unit 180 may sense which region of the display unit 151 has been touched. Here, the touch controller may be a component separate from the control unit 180, the control unit 180, and combinations thereof.

In some embodiments, the control unit 180 may execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches includes a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize position information relating to a touch object using ultrasonic waves. The control unit 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121 typically includes at least one a camera sensor (CCD, CMOS etc.), a photo sensor (or image sensors), and a laser sensor.

Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors at rows and columns to scan content received at the photo sensor using an electrical signal which changes according to the quantity of applied light. Namely, the photo sensor may calculate the coordinates of the physical object according to variation of light to thus obtain position information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

In some embodiments, the display unit 151 may be implemented as a stereoscopic display unit for displaying stereoscopic images.

A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 is generally configured to output audio data. Such audio data may be obtained from any of a number of different sources, such that the audio data may be received from the wireless communication unit 110 or may have been stored in the memory 170. The audio data may be output during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceive, or otherwise experience. A typical example of a tactile effect generated by the haptic module 153 is vibration. The strength, pattern and the like of the vibration generated by the haptic module 153 can be controlled by user selection or setting by the control unit. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented in such a manner that the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal there through. Various command signals or power input from the cradle may operate as signals for recognizing that the mobile terminal is properly mounted on the cradle.

The memory 170 can store programs to support operations of the control unit 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a Flash memory, a hard disk, a solid state disk, a silicon disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The control unit 180 may typically control the general operations of the mobile terminal 100. For example, the control unit 180 may set or release a lock state for restricting a user from inputting a control command with respect to applications when a status of the mobile terminal meets a preset condition.

The control unit 180 can also perform the controlling and processing associated with voice calls, data communications, video calls, and the like, or perform pattern recognition processing to recognize a handwriting input or a picture drawing input performed on the touch screen as characters or images, respectively. In addition, the control unit 180 can control one or a combination of those components in order to implement various exemplary embodiments disclosed herein.

The power supply unit 190 receives external power or provide internal power and supply the appropriate power required for operating respective elements and components included in the mobile terminal 100. The power supply unit 190 may include a battery, which is typically rechargeable or be detachably coupled to the terminal body for charging.

The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance.

Various embodiments described herein may be implemented in a computer-readable medium, a machine-readable medium, or similar medium using, for example, software, hardware, or any combination thereof.

Referring now to FIGS. 1B and 1C, the mobile terminal 100 is described with reference to a bar-type terminal body. However, the mobile terminal 100 may alternatively be implemented in any of a variety of different configurations. Examples of such configurations include watch-type, clip-type, glasses-type, or as a folder-type, flip-type, slide-type, swing-type, and swivel-type in which two and more bodies are combined with each other in a relatively movable manner, and combinations thereof. Discussion herein will often relate to a particular type of mobile terminal (for example, bar-type, watch-type, glasses-type, and the like). However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are incorporated into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101.

In some embodiments, electronic components may also be mounted to the rear case 102. Examples of such electronic components include a detachable battery 191, an identification module, a memory card, and the like. Rear cover 103 is shown covering the electronic components, and this cover may be detachably coupled to the rear case 102. Therefore, when the rear cover 103 is detached from the rear case 102, the electronic components mounted to the rear case 102 are externally exposed.

As illustrated, when the rear cover 103 is coupled to the rear case 102, a side surface of the rear case 102 is partially exposed. In some cases, upon the coupling, the rear case 102 may also be completely shielded by the rear cover 103. In some embodiments, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like.

As an alternative to the example in which the plurality of cases form an inner space for accommodating components, the mobile terminal 100 may be configured such that one case forms the inner space. In this example, a mobile terminal 100 having a uni-body is formed in such a manner that synthetic resin or metal extends from a side surface to a rear surface.

If desired, the mobile terminal 100 may include a waterproofing unit (not shown) for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

FIGS. 1B and 1C depict certain components as arranged on the mobile terminal. However, it is to be understood that alternative arrangements are possible and within the teachings of the instant disclosure. Some components may be omitted or rearranged. For example, the first manipulation unit 123a may be located on another surface of the terminal body, and the second audio output module 152b may be located on the side surface of the terminal body.

The display unit 151 outputs information processed in the mobile terminal 100. The display unit 151 may be implemented using one or more suitable display devices. Examples of such suitable display devices include a liquid crystal display (LCD), a thin film transistor-liquid crystal display (TFT-LCD), an organic light emitting diode (OLED), a flexible display, a 3-dimensional (3D) display, an e-ink display, and combinations thereof.

The display unit 151 may be implemented using two display devices, which can implement the same or different display technology. For instance, a plurality of the display units 151 may be arranged on one side, either spaced apart from each other, or these devices may be integrated, or these devices may be arranged on different surfaces.

The display unit 151 may also include a touch sensor which senses a touch input received at the display unit. When a touch is input to the display unit 151, the touch sensor may be configured to sense this touch and the controller 180, for example, may generate a control command or other signal corresponding to the touch. The content which is input in the touching manner may be a text or numerical value, or a menu item which can be indicated or designated in various modes.

The touch sensor may be configured in a form of a film having a touch pattern, disposed between the window 151a and a display on a rear surface of the window 151a, or a metal wire which is patterned directly on the rear surface of the window 151a. Alternatively, the touch sensor may be integrally formed with the display. For example, the touch sensor may be disposed on a substrate of the display or within the display.

The display unit 151 may also form a touch screen together with the touch sensor. Here, the touch screen may serve as the user input unit 123 (see FIG. 1A). Therefore, the touch screen may replace at least some of the functions of the first manipulation unit 123a.

The first audio output module 152a may be implemented in the form of a speaker to output voice audio, alarm sounds, multimedia audio reproduction, and the like.

The window 151a of the display unit 151 will typically include an aperture to permit audio generated by the first audio output module 152a to pass. One alternative is to allow audio to be released along an assembly gap between the structural bodies (for example, a gap between the window 151a and the front case 101). In this case, a hole independently formed to output audio sounds may not be seen or is otherwise hidden in terms of appearance, thereby further simplifying the appearance and manufacturing of the mobile terminal 100.

The optical output module 154 can be configured to output light for indicating an event generation. Examples of such events include a message reception, a call signal reception, a missed call, an alarm, a schedule notice, an email reception, information reception through an application, and the like. When a user has checked a generated event, the controller can control the optical output unit 154 to stop the light output.

The first camera 121a can process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion, and may employ any tactile method that allows the user to perform manipulation such as touch, push, scroll, or the like. The first and second manipulation units 123a and 123b may also employ any non-tactile method that allows the user to perform manipulation such as proximity touch, hovering, or the like.

FIG. 1B illustrates the first manipulation unit 123a as a touch key, but possible alternatives include a mechanical key, a push key, a touch key, and combinations thereof.

Input received at the first and second manipulation units 123a and 123b may be used in various ways. For example, the first manipulation unit 123a may be used by the user to provide an input to a menu, home key, cancel, search, or the like, and the second manipulation unit 123b may be used by the user to provide an input to control a volume level being output from the first or second audio output modules 152a or 152b, to switch to a touch recognition mode of the display unit 151, or the like.

As another example of the user input unit 123, a rear input unit (not shown) may be located on the rear surface of the terminal body. The rear input unit can be manipulated by a user to provide input to the mobile terminal 100. The input may be used in a variety of different ways. For example, the rear input unit may be used by the user to provide an input for power on/off, start, end, scroll, control volume level being output from the first or second audio output modules 152a or 152b, switch to a touch recognition mode of the display unit 151, and the like. The rear input unit may be configured to permit touch input, a push input, or combinations thereof.

The rear input unit may be located to overlap the display unit 151 of the front side in a thickness direction of the terminal body. As one example, the rear input unit may be located on an upper end portion of the rear side of the terminal body such that a user can easily manipulate it using a forefinger when the user grabs the terminal body with one hand. Alternatively, the rear input unit can be positioned at most any location of the rear side of the terminal body.

Embodiments that include the rear input unit may implement some or all of the functionality of the first manipulation unit 123a in the rear input unit. As such, in situations where the first manipulation unit 123a is omitted from the front side, the display unit 151 can have a larger screen.

As a further alternative, the mobile terminal 100 may include a finger scan sensor which scans a user's fingerprint. The controller 180 can then use fingerprint information sensed by the finger scan sensor as part of an authentication procedure. The finger scan sensor may also be installed in the display unit 151 or implemented in the user input unit 123.

The microphone 122 is shown located at an end of the mobile terminal 100, but other locations are possible. If desired, multiple microphones may be implemented, with such an arrangement permitting the receiving of stereo sounds.

The interface unit 160 may serve as a path allowing the mobile terminal 100 to interface with external devices. For example, the interface unit 160 may include one or more of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b is shown located at the rear side of the terminal body and includes an image capturing direction that is substantially opposite to the image capturing direction of the first camera unit 121a. If desired, second camera 121a may alternatively be located at other locations, or made to be moveable, in order to have a different image capturing direction from that which is shown.

The second camera 121b can include a plurality of lenses arranged along at least one line. The plurality of lenses may also be arranged in a matrix configuration. The cameras may be referred to as an "array camera." When the second camera 121b is implemented as an array camera, images may be captured in various manners using the plurality of lenses and images with better qualities.

As shown in FIG. 1C, a flash 124 is shown adjacent to the second camera 121b. When an image of a subject is captured with the camera 121b, the flash 124 may illuminate the subject.

As shown in FIG. 1B, the second audio output module 152b can be located on the terminal body. The second audio output module 152b may implement stereophonic sound functions in conjunction with the first audio output module 152a, and may be also used for implementing a speaker phone mode for call communication.

At least one antenna for wireless communication may be located on the terminal body. The antenna may be installed in the terminal body or formed by the case. For example, an antenna which configures a part of the broadcast receiving module 111 may be retractable into the terminal body. Alternatively, an antenna may be formed using a film attached to an inner surface of the rear cover 103, or a case that includes a conductive material.

A power supply unit 190 for supplying power to the mobile terminal 100 may include a battery 191, which is mounted in the terminal body or detachably coupled to an outside of the terminal body. The battery 191 may receive power via a power source cable connected to the interface unit 160. Also, the battery 191 can be recharged in a wireless manner using a wireless charger. Wireless charging may be implemented by magnetic induction or electromagnetic resonance.

The rear cover 103 is shown coupled to the rear case 102 for shielding the battery 191, to prevent separation of the battery 191, and to protect the battery 191 from an external impact or from foreign material. When the battery 191 is detachable from the terminal body, the rear case 103 may be detachably coupled to the rear case 102.

An accessory for protecting an appearance or assisting or extending the functions of the mobile terminal 100 can also be provided on the mobile terminal 100. As one example of an accessory, a cover or pouch for covering or accommodating at least one surface of the mobile terminal 100 may be provided. The cover or pouch may cooperate with the display unit 151 to extend the function of the mobile terminal 100. Another example of the accessory is a touch pen for assisting or extending a touch input to a touch screen.

In a mobile terminal according to an embodiment of the present disclosure, in a state in which screen information corresponding to one function is output on a touch screen, the screen information may be changed in response to a touch applied to the touch screen. Also, in a case in which the touch is applied together with biometric information of a user, the screen information may be changed and additional information associated with the one function may be output.

For example, the additional information may include information may include information formed on the basis of usage information of using the mobile terminal while the user executes the one function. Also, the additional information may include information that the user checks for a private purpose or information for which specific security has been set.

Thus, the user may not only change the screen information corresponding to the one function on the basis of a touch basically applied to the touch screen but also omit a separate input or a process of going through several control steps for outputting information desired by the user by additionally inputting biometric information (for example, fingerprint information, or the like), obtaining user convenience.

Hereinafter, a mobile terminal and a method of controlling the same according to an embodiment of the present disclosure will be described in detail with reference to the accompanying drawings.

Figure 2A:
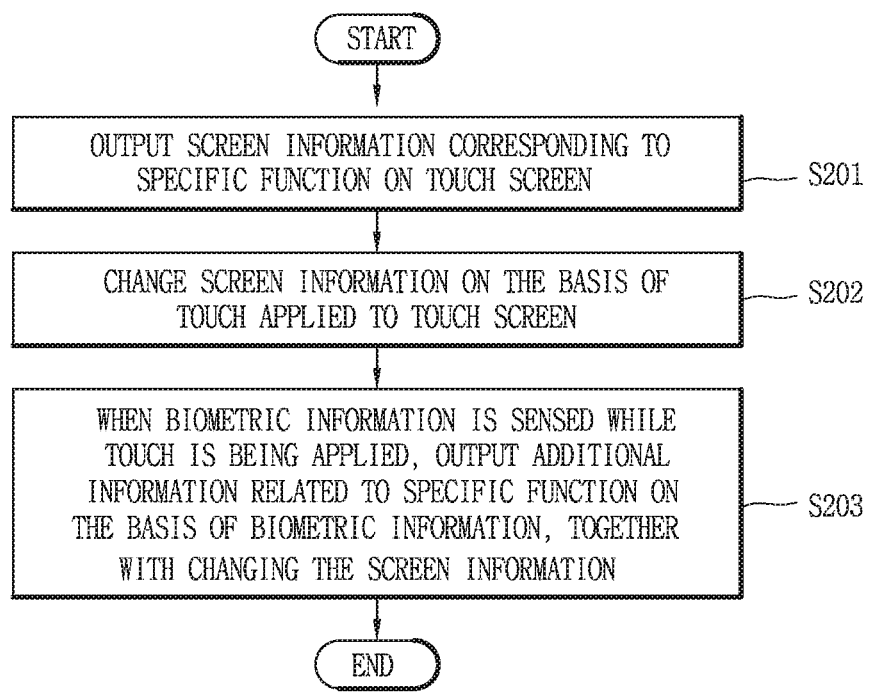
FIG. 2A is a flow chart illustrating a method of controlling a mobile terminal according to an embodiment of the present disclosure.
Figure 2B:
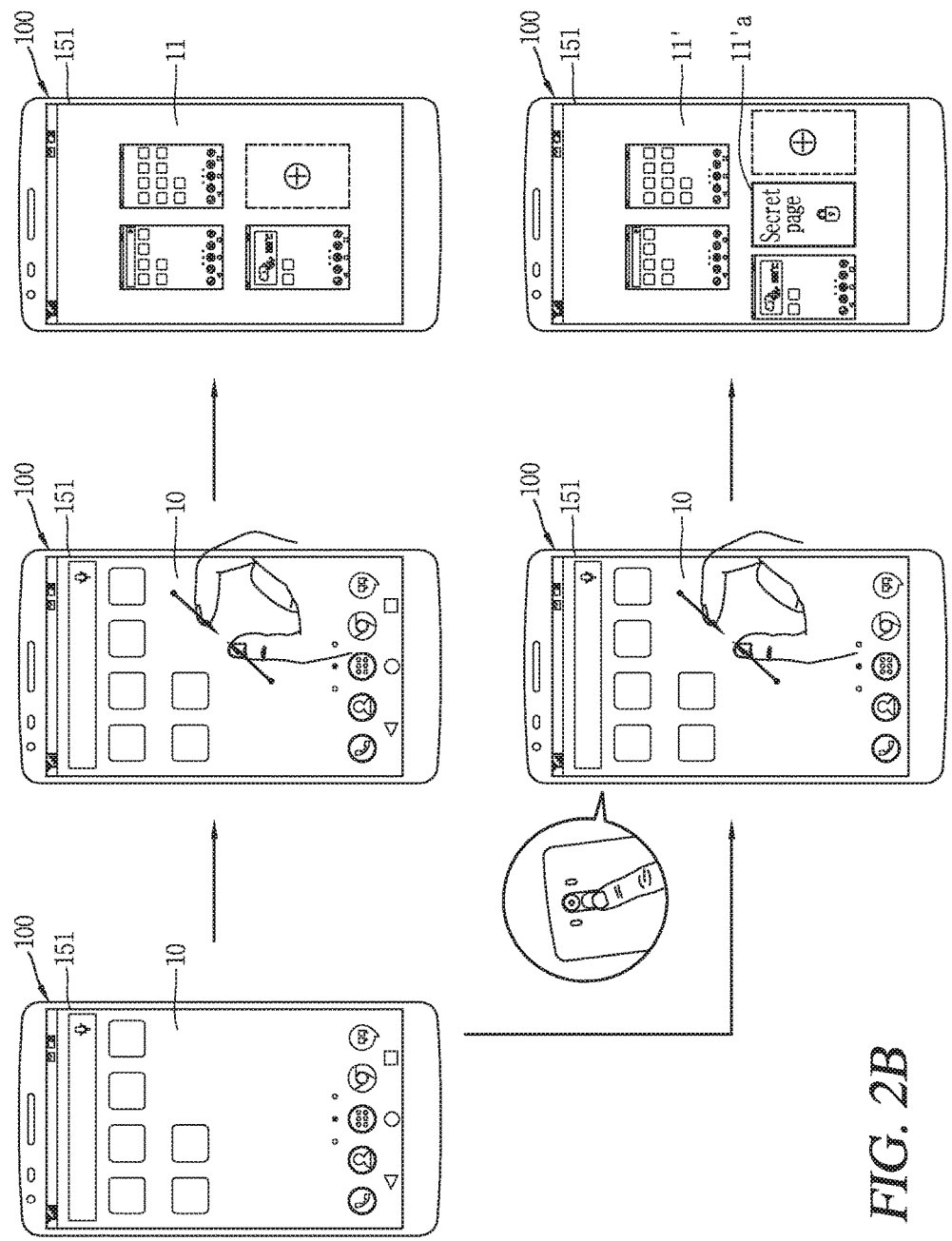
FIGS. 2B and 2C are representative views illustrating a method of controlling a mobile terminal according to an embodiment of the present disclosure.
Figure 2C:
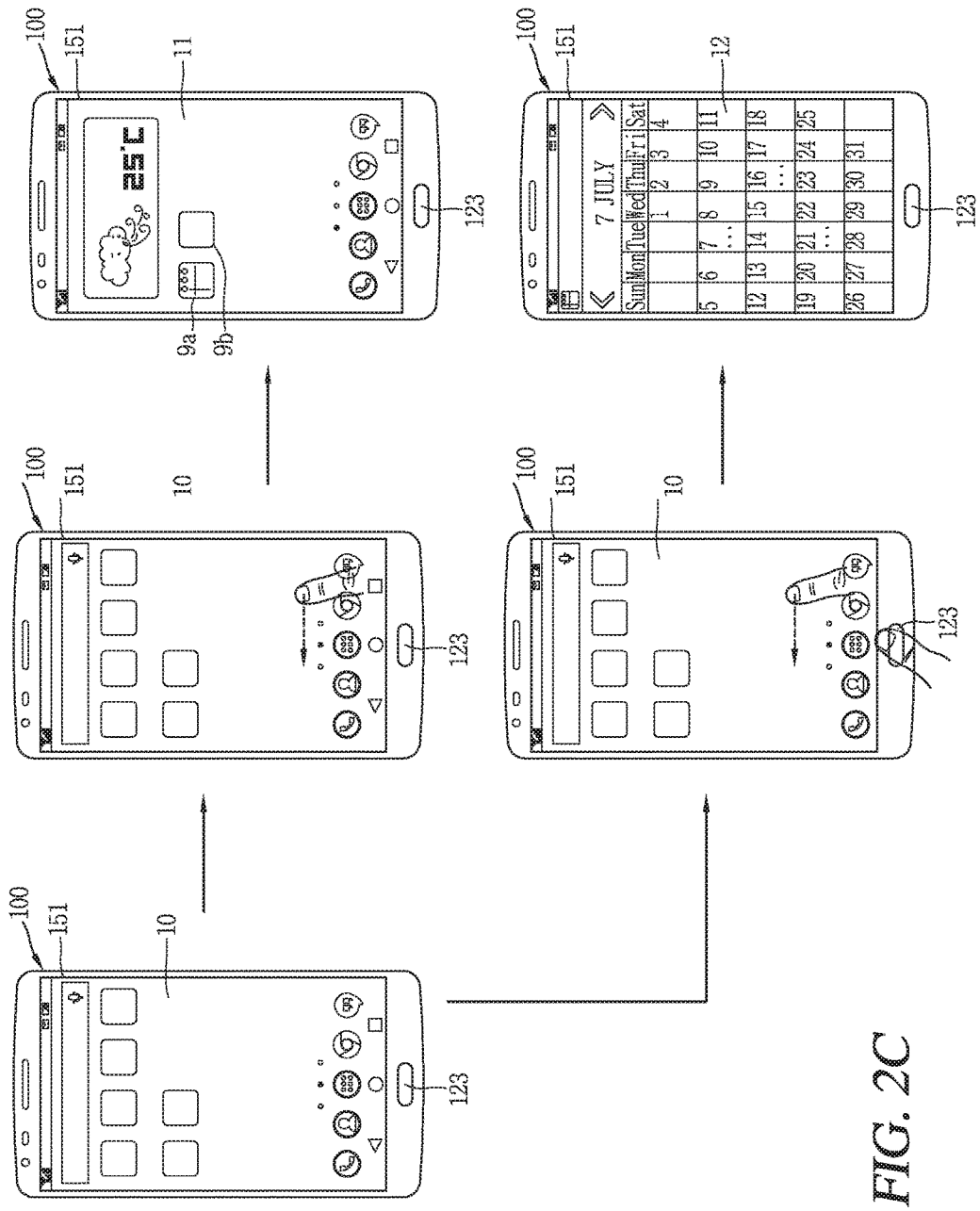

FIG. 2A is a flow chart illustrating a method of controlling a mobile terminal according to an embodiment of the present disclosure, and FIGS. 2B and 2C are representative drawings regarding a method of controlling a mobile terminal according to an embodiment of the present disclosure.

First, referring to FIG. 2A, screen information corresponding to a specific function may be output on a touch screen of the mobile terminal according to an embodiment of the present disclosure (S201).

Here, the specific function may include any type of function that may be executed in the mobile terminal 100. For example, the specific function may be a function corresponding to an application that may be executed in the mobile terminal 100, a lock function of limiting reception of a control command with respect to the mobile terminal 100, and the like.

In another example, the specific function may be a function providing a work space including an execution icon of a preset application. In this case, as illustrated in the first drawing of each of FIGS. 2B and 2C, screen information (home screen page 10), screen information (home screen page) 10 corresponding to a function providing the work space may be output on the touch screen 151.

Also, the mobile terminal 100 according to an embodiment of the present disclosure may include a sensing unit 140 sensing biometric information of the user.

For example, the biometric information may include body information corresponding to at least part of the user's body. In detail, the biometric information may include iris information of the user, fingerprint information of the user, and the like. In another example, the biometric information may be specific information formed from at least part of the user's body. That is, a voice signal formed by the user, a pulsation signal or body temperature information of the user, and the like, may be included in the biometric information.

In a case in which screen information corresponding to the specific function is output on the touch screen 151, the control unit 180 may control the sensing unit 140 to sense the biometric information of the user. In this disclosure, an embodiment in which fingerprint information of the user is used as biometric information of the user will be described.

Meanwhile, the fingerprint information may be sensed through the touch screen by a fingerprint recognition sensor included in the touch screen. In a specific example, in a case in which a touch is applied to the touch screen 151 and fingerprint information corresponding to a finger applying the touch is sensed by the fingerprint recognition sensor, the control unit 180 may obtain the fingerprint information as the biometric information.

In another example, in the main body of the mobile terminal 100, the user input unit 123 for receiving a user's control command may be provided in the form of a hardware key, and the hardware key may include a fingerprint recognition sensor for sensing the fingerprint information. Here, in a case in which fingerprint information corresponding to a finger that comes into contact with a specific region (for example, a region in which the hardware key is provided) of the main body of the mobile terminal 100 is sensed, the control unit 180 may obtain the fingerprint information as the biometric information.

In this manner, in a state in which the screen information corresponding to the specific function is output on the touch screen 151, the control unit 180 may control the touch screen 151 to change the screen information on the basis of a touch applied thereto (S202).

The touch may be a touch for changing the screen information output on the touch screen 151. The control unit 180 may change the screen information according to a preset scheme in response to the touch in the mobile terminal 100. In detail, the control unit 180 may execute a function set to correspond to the position to which the touch has been applied, and change the screen information to correspond thereto.

For example, in a case in which the touch is a simple touch applied to an execution icon of a specific application included in the screen information, the control unit 180 may execute the specific application and subsequently switch the screen information to an execution screen corresponding to the specific application.

In another example, in a case in which a touch is applied to an adjustment key for adjusting an output state of the screen information, the control unit 180 may execute an adjustment function on the basis of a function set in the adjustment key, and subsequently change the screen information such that information obtained by performing the adjustment function is output on the touch screen.

Also, the control unit 180 may change the screen information to correspond to a scheme in which a touch is applied.

For example, referring to the drawings corresponding to the upper arrows in FIG. 2B, in a state in which the screen information 10 is output, a preset type of touch (for example, a pinch-in-touch applied by dragging separate touches applied to two points in a direction toward each other) may be applied to the touch screen 151. In this case, on the basis of the preset type of touch, the screen information 10 may be changed to screen information 11 including all the pages constituting the screen information 10.

In another example, referring to the drawings corresponding to the upper arrows in FIG. 2C, in a state in which the screen information 10 is output, when a preset type of touch (for example, a drag touch applied in one direction) is applied to the touch screen 151, the control unit 180 may switch a page corresponding to the screen information 10 to a screen 11 of a different page.

Meanwhile, in a case in which the biometric information is sensed by the sensing unit 140 while the touch is being applied, the control unit 180 may change the screen information and control the touch screen 151 to output additional information related to the specific function on the basis of the biometric information (S203).

Here, the additional information related to the specific function may be information related to at least one of preset personal information and usage pattern information of the user formed in relation to execution of the specific function.

Here, the preset personal information may include information classified on the basis of a specific reference (for example, visual information or hearing information included in a specific personal file), preset authentication information, and information stored together with the preset authentication information. In a specific example, secret memo information or code information in which a condition for sensing an image or text information, voice file information, and specific biometric information of the user is set may be the preset personal information.

Also, the usage pattern information of the user formed in relation to execution of the specific function may include at least one of information regarding the number of times of using sub-menus included in the specific function or a time when the sub-menus included in the specific function are used, information regarding a pattern in which the screen information is changed while the specific function is being executed, and information regarding a different function executed together with the specific function.

In detail, while the specific function is being executed, the control unit 180 may collect information regarding a pattern in which the mobile terminal 1000 is used in relation to execution of the specific function.

For example, in a state in which the specific function is being executed, the control unit 180 may form information regarding the number of times (frequency) of using the sub-menus included in the specific function, a time when the sub-menus are used (sub-menus that the user has recently used for a preset period of time), and the like, as usage pattern information of the user related to the specific function.

In this case, the additional information may be an execution screen including the sub-menus or execution information according to execution of the sub-menus.

In a specific example, while a function corresponding to a message application is being executed, sub-menu information (for example, an origination message menu) frequently used by the user may be formed as usage pattern information of the user related to the message application function.

In another example, the control unit 180 may form information regarding a pattern in which the screen information is changed on the basis of a control command input by the user in a state in which the screen information corresponding to the specific function is output, as the usage pattern information.

In this case, the additional information may be execution screen information changed on the basis of the change pattern of the screen information or information inducing change according to the change pattern of the screen information.

In an specific example, in a case in which first screen information including sub-menu information of the message application on the basis of execution of the message application is changed to second screen information for transmitting a message to a specific counterpart on the basis of a user's touch, a pattern in which the first screen information is changed to the second screen information may be used as the usage pattern information.

In another example, the control unit 180 may form information regarding other functions executed together with the specific function, among functions that may be executed in the mobile terminal 100, as the usage pattern information. That is, the control unit 180 may form information regarding a function frequently executed by the user together with the specific function or a function associated with the specific function, that is, a function which has been executed together with the specific function, as the usage pattern information.

In this case, the additional information may be list information regarding the different function, execution information according to execution of the different function, or information recommending information associated with the specific function.

In a specific example, while the user is executing a Web browsing function, if the user frequently executes a music playback function together with the Web browsing function, the music playback function may be formed as usage pattern information related to the Web browsing function.

Meanwhile, while the touch is being applied, the control unit 180 may determine additional information to be output together with the changed screen information from at least one of the preset personal information and the usage pattern information on the basis of the biometric information sensed by the sensing unit 140.

For example, in a case in which the biometric information is sensed by a sensor (that is, the sensing unit) provided at a specific position, the control unit 180 may control the touch screen 151 to output the preset personal information as the additional information. That is, in a case in which biometric information is sensed by sensors provided at different positions, the control unit 180 may control the touch screen 151 to output different types of additional information on the basis of the biometric information corresponding to the respective positions.

That is, referring to drawings corresponding to lower arrows in FIG. 2B, a separate hardware key may be provided on a rear surface of the main body of the mobile terminal 100, and the hardware key may include a fingerprint recognition sensor. Here, referring to the drawing in the direction of a lower arrow from the first drawing, when fingerprint information is sensed through the hardware key on the rear surface of the terminal body while the touch is being applied, the control unit 180 may select preset personal information as additional information.

Thus, as in the final drawing in the direction of the lower arrow in FIG. 2B, the screen information 10 is changed to screen information 11' including all the pages and the preset personal information (specific page 11' a) may be output as additional information.

In contrast, referring to drawings corresponding to lower arrows in FIG. 2C, the fingerprint information may be sensed through the hardware key 123 provided on the front surface of the main body of the mobile terminal 100. In this case, the control unit 180 may form the additional information from usage pattern information of the user.

For example, in a state in which the user outputs one page of the home screen page, when the user frequently executes a specific application included in the one page, an execution pattern of the specific application in relation to the one page may be formed as the usage pattern information.

In this case, as illustrated in the drawings corresponding to the lower arrows in FIG. 2C, the control unit 180 may execute a specific application (for example, a schedule application 9a) included in the one page on the basis of sensing of a touch outputting the one page and the fingerprint information. Also, the control unit 180 may output execution information (for example, an execution screen 12) on the touch screen 151, while changing the page of the home screen in response to the touch.

In another example, in a case in which the biometric information is sensed together from the sensors provided at different positions, the control unit 180 may output preset specific personal information as the additional information or may output a plurality of pieces of additional information on the touch screen 151.

In another example, in a case in which pieces of biometric information sensed by the sensors provided at specific positions are different (for example, pieces of fingerprint information corresponding to different fingers), the control unit 180 may output different pieces of additional information.

In this manner, in addition to basically changing screen information on the basis of a touch, when biometric information is input together from the user, the mobile terminal 100 according to an embodiment of the present disclosure may additionally output a usage pattern or personal information of the user.

Thus, while executing the specific function, the user may easily use required personal information without an authentication procedure or without searching. Also, since information regarding a usage pattern of the user is automatically formed while the specific function is being executed, in a case in which the specific function is executed, the user may be provided with additional information appropriate for the usage pattern of the user by simply inputting biometric information.

Hereinafter, another embodiment related to the usage pattern information will be described.

As described above, the usage pattern information is usage pattern information regarding the mobile terminal of the user formed in relation to the specific function, which may also include usage pattern information of the user regarding a function related to the specific function, in addition to the usage pattern of the user related to the specific function itself.

For example, in a case in which the specific function is a function providing a work space including execution icons regarding a plurality of applications, usage pattern information of the user related to execution of other functions included in the screen information may be formed.

Figure 3A:
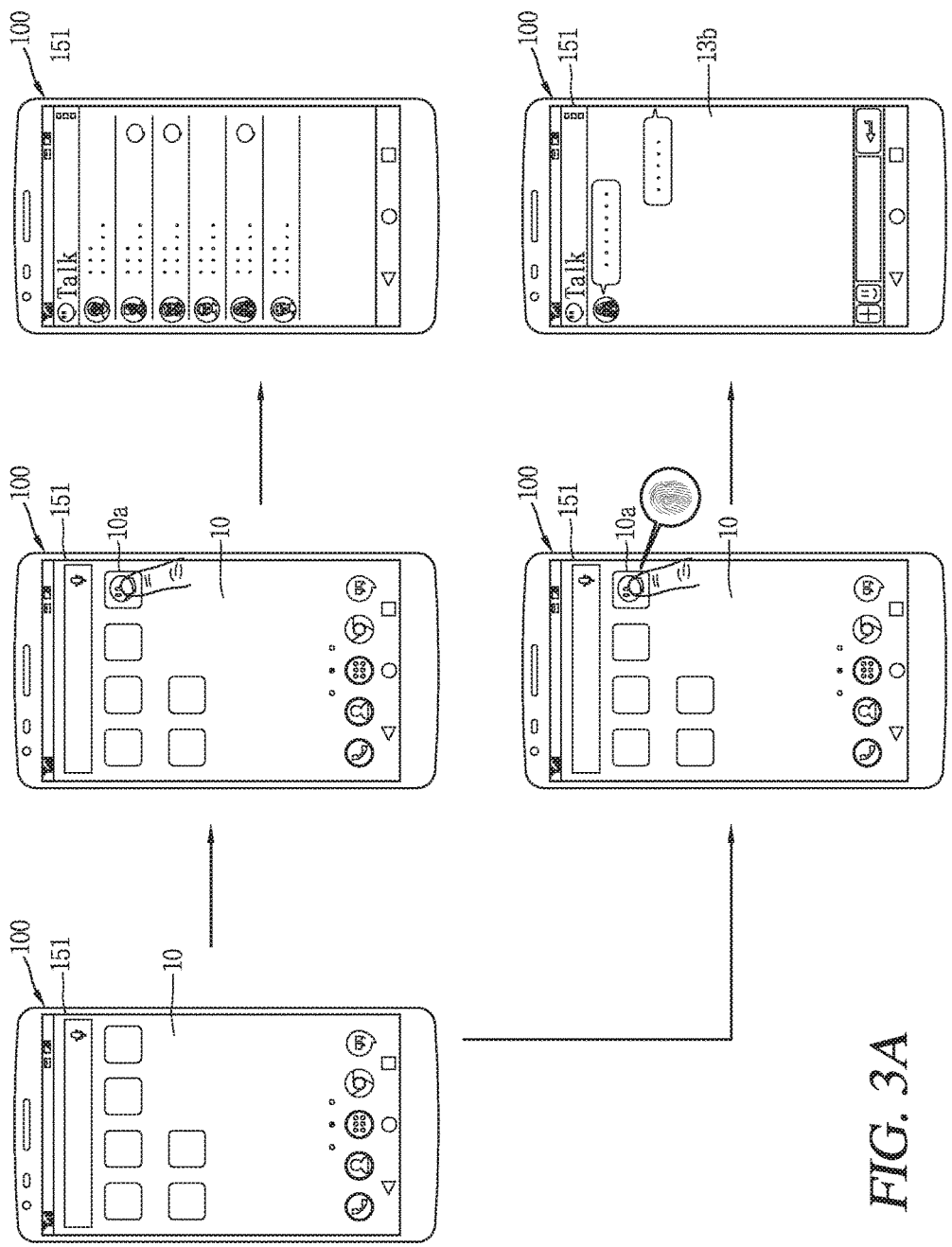
FIGS. 3A and 3B are views illustrating an embodiment of additional information related to usage pattern information.
Figure 3B:
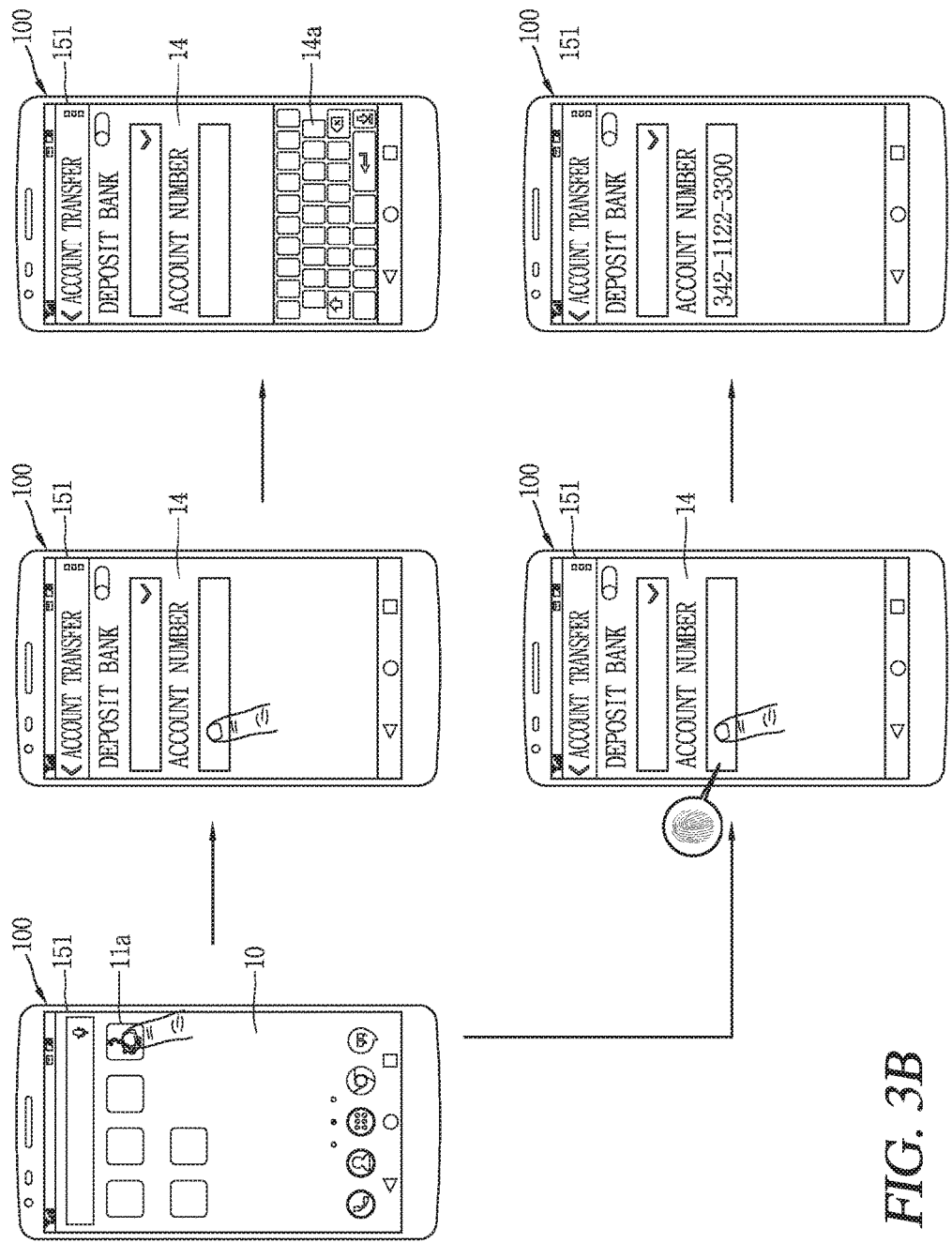

FIGS. 3A and 3B are views illustrating an embodiment of additional information related to usage pattern information.

As described above, the fingerprint information may also be sensed by the fingerprint recognition sensor included in the touch screen 151. For example, when a touch applied to the touch screen 151 is maintained for a preset period of time, the fingerprint recognition sensor may sense fingerprint information corresponding to a finger that applies the touch.

First, referring to a first drawing of FIG. 3A, screen information (home screen page) 10 corresponding to a specific function providing a work space for execution convenience of functions respectively corresponding to a plurality of applications may be output on the touch screen 151.

Here, as illustrated in a second drawing among drawings corresponding to the upper arrows in FIG. 3A, a touch may be applied to an icon 10a corresponding to one application included in the home screen page 10. In this case, as illustrated in a third drawing, an execution screen corresponding to the one application may be output on the touch screen 151.

Here, the execution screen corresponding to the one application may be an execution screen corresponding to a final execution state of the one application or may be a preset execution screen output on the basis of execution of the one application.

On the other hand, referring to drawings corresponding to the lower arrows in FIG. 3A, the touch applied to the icon 10a of the one application may be maintained for a period of time equal to or longer than a preset period of time and fingerprint information corresponding to the finger which has applied the touch may be sensed by the fingerprint recognition sensor.

In this case, the control unit 180 may search for usage pattern information of the user related to a function of the one application included in the work space related to the specific function. For example, the usage pattern information may be execution screen information corresponding to a sub-menu frequently used by the user, among execution screens according to execution of the one application.

Thus, as illustrated in a final drawing among the drawings corresponding to the lower arrows in FIG. 3A, as the screen information 10 is changed to execution screen information according to execution of the one application, execution screen information 13*b* corresponding to the sub-menu may be output on the touch screen 151.

In another example, referring to a first drawing of FIG. 3B, when a touch is applied to an execution icon 11*a* of one application on the screen information 10 output on the touch screen 151, an execution screen 14 corresponding to the one application may be output.

Here, on the basis of a touch applied to a specific area (for example, an information input window) of the execution screen 14 as illustrated in a second drawing among drawings corresponding to upper arrows in FIG. 3B, the screen information 14 may be changed to include a keypad 14*a* for inputting information as illustrated in a third drawing.

On the other hand, as illustrated in a second drawing among drawings corresponding to the lower arrows in FIG. 3B, on the basis of the touch maintained in the specific area of the screen information 14, fingerprint information may be sensed by the fingerprint recognition sensor.

Also, the control unit 180 may search for the usage pattern information on the basis of the fingerprint information. For example, the usage pattern information may be change pattern information that the screen information is changed by information input by the user in the screen information including the specific region.

Thus, as illustrated in a third drawing corresponding to the lower arrows in FIG. 3B, when the touch and the fingerprint information are input together, the control unit 180 may control the touch screen 151 to output additional information on the basis of the change pattern information on the specific area.

In this manner, since the biometric information is immediately obtained from the touch for executing any one function, the user may conveniently use screen information corresponding to the one function even without an additional input for using information desired by the user or searching.

Meanwhile, as described above, the fingerprint information may be input through a region (for example, a specific area of the main body of the mobile terminal) separate from the touch. In this case, the control unit 180 may control an output state of the additional information according to whether the biometric information is sensed.

Figure 4A:
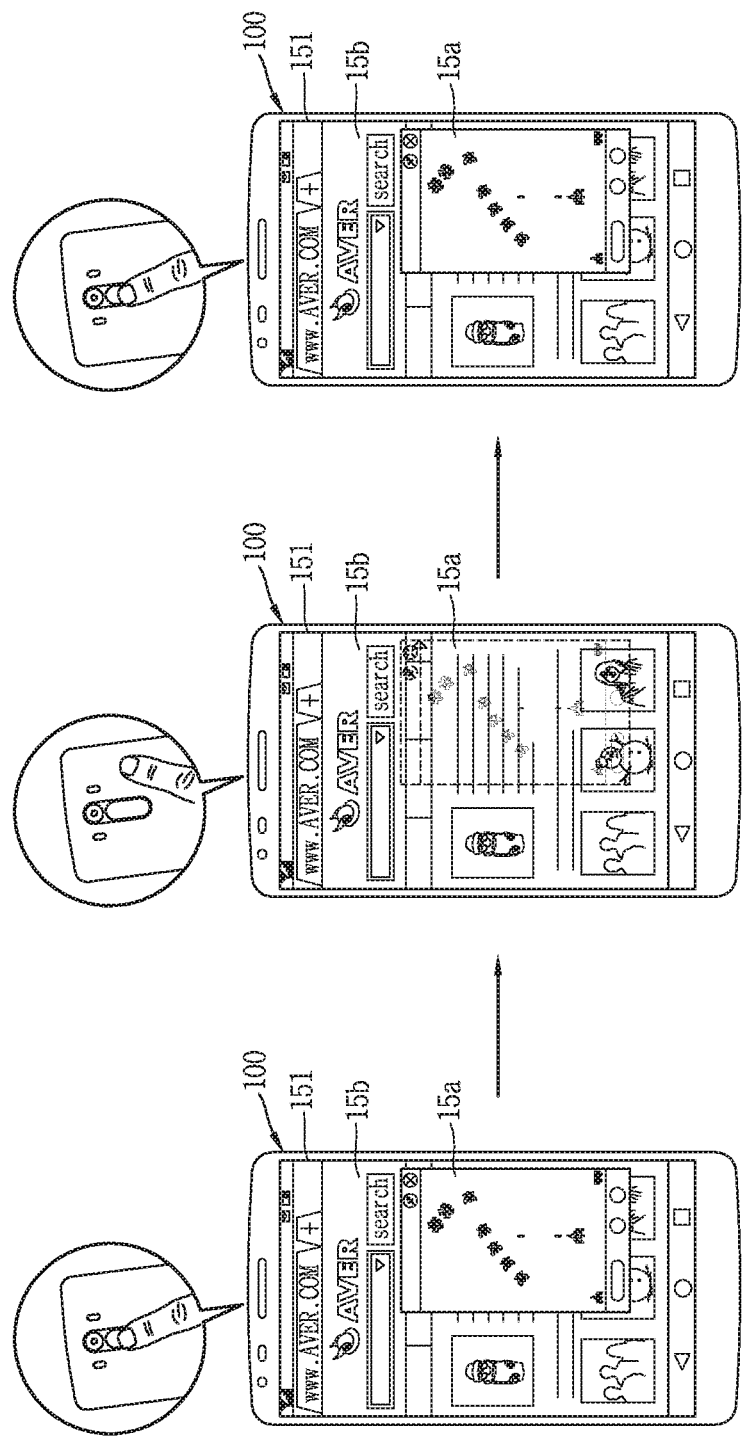
FIGS. 4A and 4B are views illustrating an embodiment related to controlling an output state of additional information on the basis of sensing of biometric information.
Figure 4B:
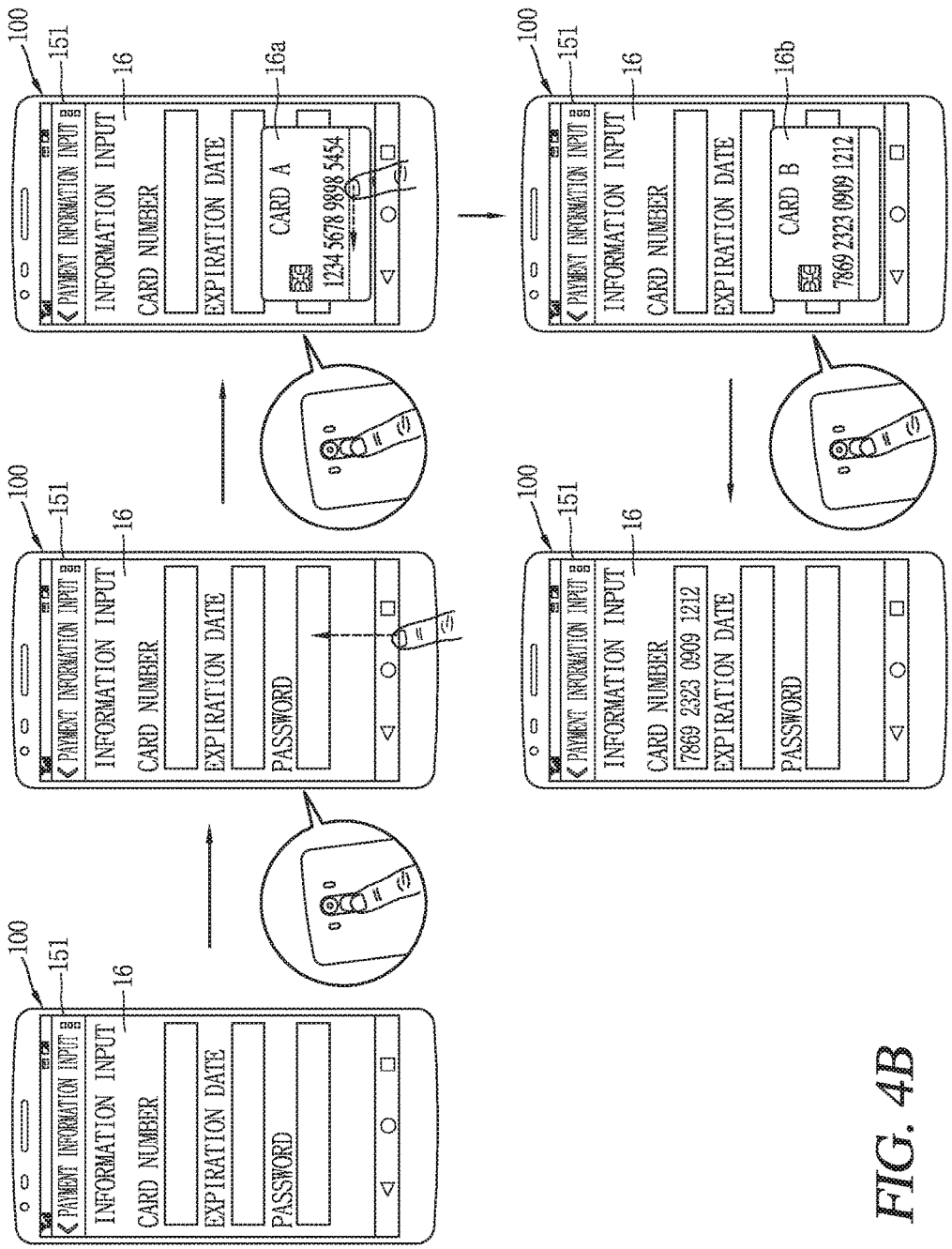

FIGS. 4A and 4B are views illustrating an embodiment related to controlling an output state of additional information on the basis of sensing of biometric information.

First, referring to FIG. 4A, screen information 15*b* corresponding to a specific function may be output on the touch screen 151. Also, when a touch (not shown) for changing the screen information 15*b* and the biometric information are sensed, additional information (for example, execution information 15*a* according to execution of a different function) related to usage pattern information of the user formed in relation to the specific function may be output.

In this manner, in a state in which the additional information 15*a* is output, it may be determined whether the biometric information is continuously sensed from a specific region of the main body of the mobile terminal 100 (for example, one region of the rear surface of the main body of the mobile terminal 100). The control unit 180 may change an output state of the additional information according to the determination result.

In detail, in a state in which the additional information is output, the control unit 180 may control the touch screen 151 to maintain output of the additional information while the fingerprint information is being continuously sensed by the fingerprint recognition sensor provided in a specific region of the main body of the mobile terminal 100.

Also, in a case in which it is determined that the fingerprint information is not sensed by the fingerprint recognition sensor, the control unit 180 may control the touch screen 151 such that the additional information disappears from the touch screen 151 on the basis of the fact that the fingerprint information is not sensed.

For example, the control unit 180 may control the touch screen 151 such that transparency regarding the additional information is changed according to whether the fingerprint information is sensed. That is, as illustrated in a second drawing of FIG. 4A, when the fingerprint information is not sensed, the additional information 15*a* may disappear from the touch screen 151. Also, as illustrated in a third drawing of FIG. 4A, when the fingerprint information appears again, the control unit 180 may control the touch screen 151 such that output of the additional information 15*a* is maintained while the fingerprint information is being sensed.

In this manner, the user may change an output state of the additional information by contacting or by not contacting a finger on other region of the main body of the mobile terminal 100. Thus, in a case in which the additional information overlaps at least a portion of previously output screen information or in a case in which output of at least a portion of the screen information is limited, the user may conveniently selectively output desired information, without having to terminate output of the additional information.

Also, in a case in which the additional information is in plurality, the user may change an output state regarding the plurality of pieces of additional information by using an input and a touch of the biometric information.

That is, referring to FIG. 4B, screen information corresponding to a specific function is output on the touch screen 151 as illustrated in a first drawing of FIG. 4B, and on the basis of a touch applied to the touch screen 151 and fingerprint information applied to a specific region of the main body of the mobile terminal 100 as illustrated in a second drawing of FIG. 4B, additional information 16*a* may be output as illustrated in a third drawing of FIG. 4B.

Also, in a case in which the fingerprint information is sensed together from each of touches applied to the touch screen 151 and a specific region of the main body of the mobile terminal 100, the control unit 180 may control the touch screen 151 to output the additional information on a region corresponding to the point to which the touch has been applied in the touch screen 151 as illustrated in the third drawing of FIG. 4B.

Here, the additional information 16*a* may be user's personal information (image information regarding a settlement terminal) previously set in relation to the specific function (function of inputting personal information to be used for payment).

In a case in which a plurality of pieces of additional information are output in relation to the specific function, in a state in which one of the plurality of pieces of additional information is output, the user may switch the one additional information to another additional information and output the same by using a touch. Here, the user may apply the touch in a state in which a finger contact on a specific region of the main body of the mobile terminal 100 is maintained.

That is, when a touch is applied through the touch screen 151 while the user's fingerprint information is sensed from the specific region as illustrated in a third drawing of FIG. 4B, the control unit 180 may switch the additional information 16*a* to different additional information 16*b* to output the same as illustrated in a fourth drawing of FIG. 4B.

Also, the pieces of additional information 16a and 16b may be maintained in the output state while the fingerprint information is sensed. Thus, as illustrated in a fifth drawing of FIG. 4B, in a case in which the fingerprint information is not sensed any longer from the specific region, the control unit 180 may control the touch screen 151 to terminate output of the additional information 16b.

Meanwhile, the control unit 180 may control the touch screen 151 such that information related to the additional information 16b maintained in the final output state is input to the screen information 16 when the output of the additional information 16b is terminated.

In this manner, in a state in which input of the fingerprint information is maintained, the user may terminate output of the additional information by changing the additional information by using a touch applied to the touch screen 151 or by limiting input of the fingerprint information. Thus, the mobile terminal according to an embodiment of the present disclosure may implement various interfaces of adjusting an output state of information by utilizing fingerprint information of the user.

Also, in a case in which the biometric information is obtained, the control unit 180 may perform a preset authentication function by comparing the biometric information with preset biometric information. The control unit 180 may determine the additional information according to the result of performing the preset authentication function.

In detail, the control unit 180 may determine whether the biometric information matches the preset biometric information, and control the touch screen 151 to output different additional information on the basis of the determination result.

For example, when it is determined that the biometric information matches the preset biometric information, the control unit 180 may determine the preset personal information as the additional information, and when it is determined that the biometric information does not match the preset biometric information, the control unit 180 may determine the usage pattern information of the user formed in relation to the execution of the specific function as the additional information.

In another example, in a case in which the usage pattern information of the user is output as the additional information, the control unit 180 may output different types of usage pattern information (first usage pattern information and second usage pattern information) as the additional information according to the result of performing the preset authentication.

That is, the control unit 180 may collect information regarding a different function executed together with the specific function by the user, while the specific function is being executed, as the usage pattern information. And, in a case in which it is determined that the biometric information matches the preset biometric information, the control unit 180 may execute the different function and outputs execution information according to execution of the different function, and in a case in which it is determined that the biometric information does not match the preset biometric information, the control unit 180 may output list information regarding the different function.

Figure 5A:
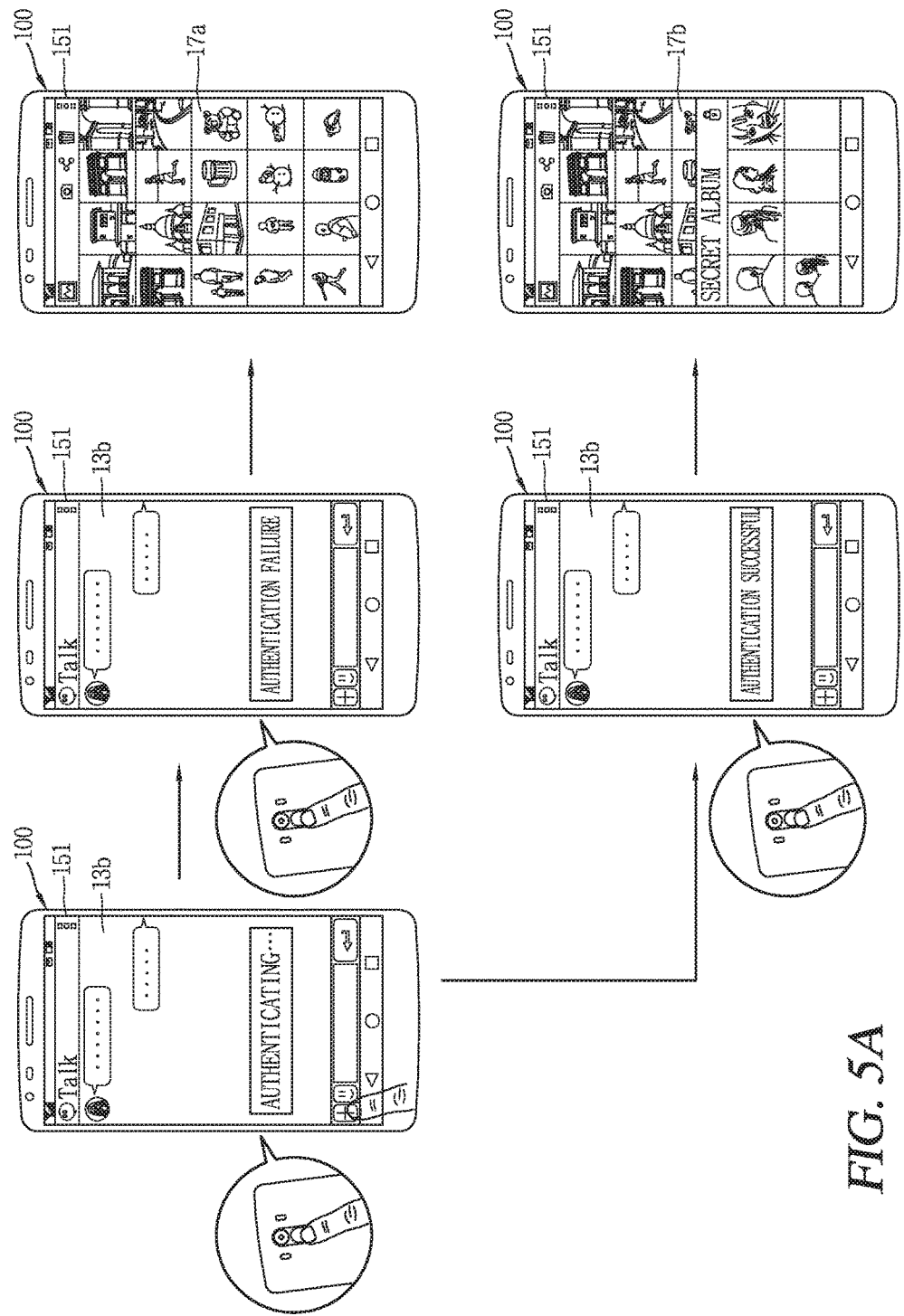
FIGS. 5A and 5B are views illustrating an embodiment in which different types of additional information are output according to results of performing an authentication function regarding biometric information.
Figure 5B:
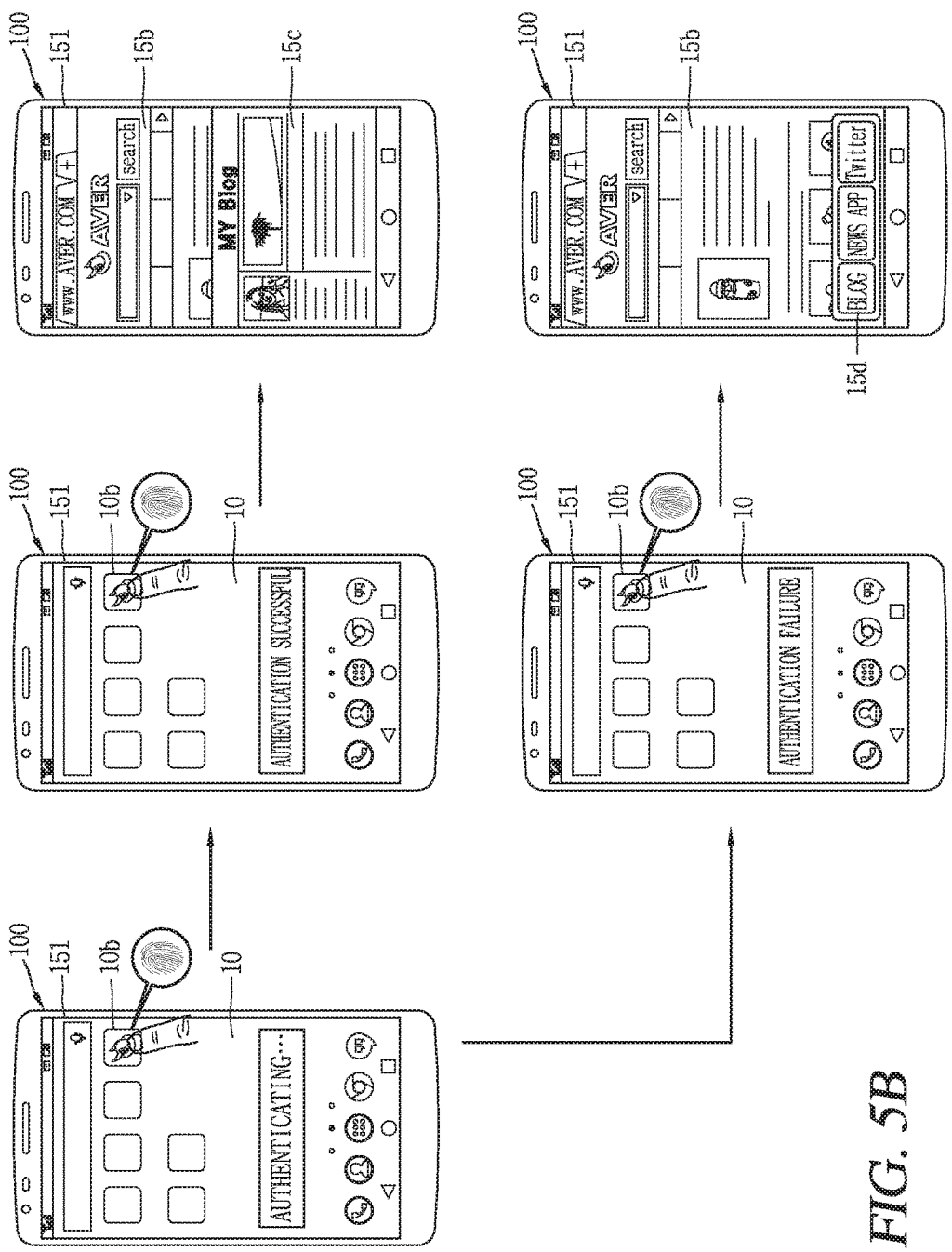

FIGS. 5A and 5B are views illustrating an embodiment in which different types of additional information are output according to results of performing an authentication function regarding biometric information.

First, referring to FIG. 5A, screen information 13b corresponding to a specific function of the touch screen 151 is output, and a touch may be applied to the touch screen 151 and fingerprint information may be input to a specific region of the main body of the mobile terminal 100. Here, the control unit 180 may perform a preset authentication function by determining whether the fingerprint information matches preset fingerprint information.

When it is determined that the fingerprint information does not match the preset fingerprint information, the control unit 180 may provide authentication failure information and output additional information 17a using screen information change pattern of the user related to the specific function on the touch screen 151 as illustrate din the drawings corresponding to the upper arrows.

Meanwhile, when it is determined that the fingerprint information matches the preset fingerprint information, the control unit 180 may provide authentication success information and output additional information 17b including preset personal information related to the specific function on the touch screen 151 as illustrated in drawings corresponding to the lower arrows.

In another example, referring to FIG. 5B, in a state in which screen information 10 corresponding to a specific function is output on the touch screen 151, when touch and fingerprint information are input, the control unit 180 may perform an authentication function regarding the fingerprint information.

In a case in which the preset authentication function is successful on the basis of the fingerprint information, the control unit 180 may select one function among functions executed together with the specific function on the basis of a usage pattern of the user, and execute the selected one function. Also, the control unit 180 may output execution information regarding the selected one function, as additional information. For example, the additional information 15c may be output together with the screen information 15b on the touch screen 151 as illustrated in the final drawing among the drawings corresponding to the upper arrows in FIG. 5B.

Also, in a case in which the preset authentication function fails on the basis of the fingerprint information, the control unit 180 may output list information 15d regarding other functions executed together with the specific function, as the additional information as illustrated in the drawings corresponding to the lower arrows of FIG. 5B.

That is, when the authentication is successful, the control unit 180 may determine that the user uses the mobile terminal, execute a different function frequently executed together with the specific function, and provide corresponding execution information. Also, when the authentication fails, the control unit 180 may provide information regarding a specific function which has been frequently used together with the specific function and perform controlling that may be executed on the basis of an additional selection.

Also, after the additional information is output, the control unit 180 may determine whether the biometric information matches the preset biometric information. When it is determined that the biometric information does not match the preset biometric information, the control unit 180 may control the touch screen 151 such that the screen information is switched to a locked state in which reception of a control command by a touch is limited.

After the screen information is switched to the locked state, in a case in which the biometric information is sensed by the sensing unit 140 again, the control unit 180 may perform the preset authentication function again using the sensed fingerprint information. In a case in which the sensed fingerprint information does not match the preset fingerprint information, the control unit 180 may switch the touch screen 151 to a deactivated state.

Hereinafter, a related embodiment will be described.

Figure 6A:
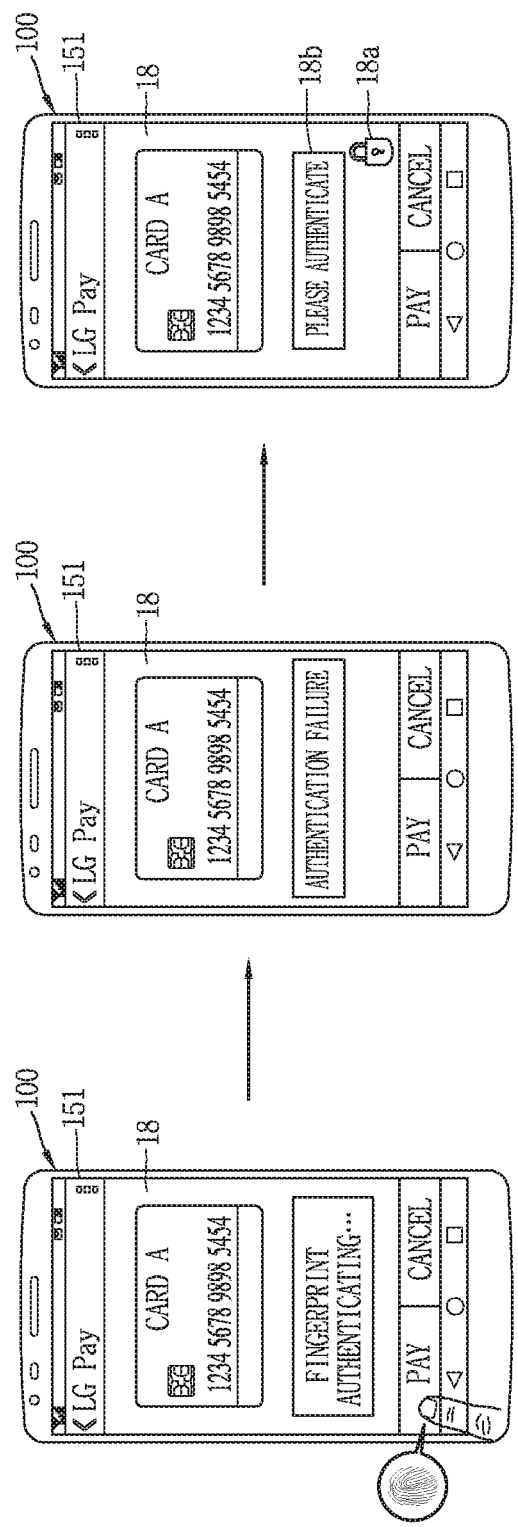
FIGS. 6A and 6B are views illustrating an embodiment in which reception of a control command is limited according to results of performing an authentication function regarding fingerprint information after additional information is output.
Figure 6B:
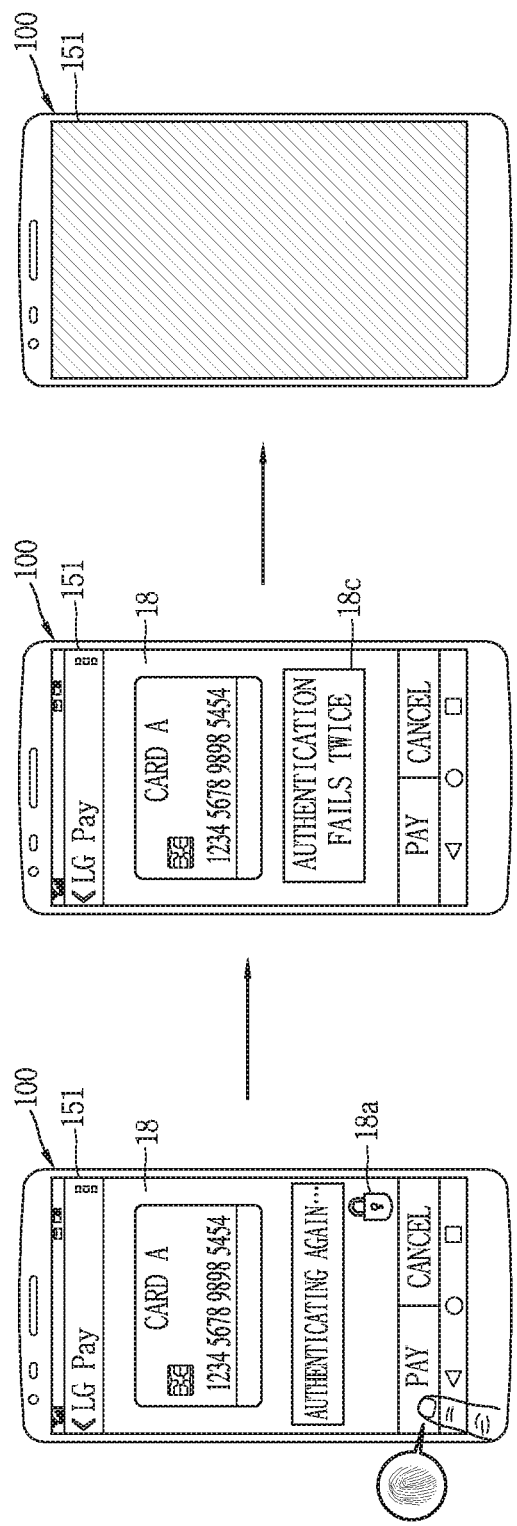

FIGS. 6A and 6B are views illustrating an embodiment in which reception of a control command is limited according to results of performing an authentication function regarding fingerprint information after additional information is output.

First, referring to FIG. 6A, screen information 18 corresponding to a specific function and additional information (for example, a card image) may be output on the touch screen 151, and the specific function may be a function which requires a preset authentication (for example, payment function executed on the basis of personal information or information requiring security, and the like).

Here, after the additional information is output, the control unit 180 may perform a preset authentication function for executing the specific function by using fingerprint information sensed by the fingerprint recognition sensor. In detail, the control unit 180 may perform the preset authentication function by determining whether the sensed fingerprint information matches the preset fingerprint information.

If it is determined that the sensed fingerprint information and the preset fingerprint information do not match, the control unit 180 may output information of preset authentication failure on the touch screen 151 as illustrated in a second drawing of FIG. 6A. Also, on the basis of the authentication failure, the control unit 180 may control the touch screen 151 such that reception of a control command by a touch on the screen information 18 is limited.

Thus, in a case in which an additional authentication procedure is not performed, reception of a touch may be limited on the touch screen 151 as illustrated in a third drawing of FIG. 6A. The control unit 180 may output notification information 18a indicating that reception of a touch on the screen information 18 is limited and a message 18b requesting additional authentication, on the touch screen 151.

In this manner, after the screen information 18 is switched to the locked state, the user may perform the authentication function regarding the fingerprint information by maintaining a touch on one region of the touch screen 151 as illustrated in a first drawing of FIG. 6B. The control unit 180 may perform the preset authentication function by using the fingerprint information sensed again through the touch screen 151.

Here, in a case in which authentication based on the fingerprint information through the authentication function performed again is not successful, the control unit 180 may output information 18c indicating failure of the authentication performed again, on the touch screen 151. Although not shown, the control unit 180 may additionally output information regarding the number of times by which the authentication function is available to be performed on the touch screen 151.

When the authentication function performed again fails, the control unit 180 may switch the touch screen 151 to a deactivate state in which lighting is turned off as illustrated in a third drawing of FIG. 6B. In this state, when the user inputs an activation control command for turning on the lighting of the touch screen 151, a preset locked screen may be output on the touch screen 151.

Thus, in the mobile terminal according to an embodiment of the present disclosure, in a state in which screen information of a specific function executed on the basis of performing of a preset authentication function, authentication may be performed using fingerprint information of the user, and when the authentication fails, a state of the touch screen 151 may be controlled such that access of someone else who is not an authenticated user is limited.

Meanwhile, while the specific function is being executed, the control unit 180 may execute various functions on the basis of a control command applied to the mobile terminal 100. The control command may include a touch applied to the touch screen 151, a voice command applied through the microphone 122, sensing of a preset gesture of the mobile terminal 100, and the like, while the specific function is being executed.

When the control command is sensed to be input together with biometric information, the control unit 180 may store the control command by associating it with the biometric information. For example, in a case in which a capture function is performed on the basis of a specific control command on screen information corresponding to the specific function, when the specific control command and biometric information are input together, the control unit 180 may store the specific control command by associating it with the biometric information.

Thereafter, when the specific function is executed again and the biometric information associated with the specific control command is sensed, the control unit 180 may output information (for example, capture image information according to performing of a capture function) associated with the specific control command, as the additional information.

Figure 7A:
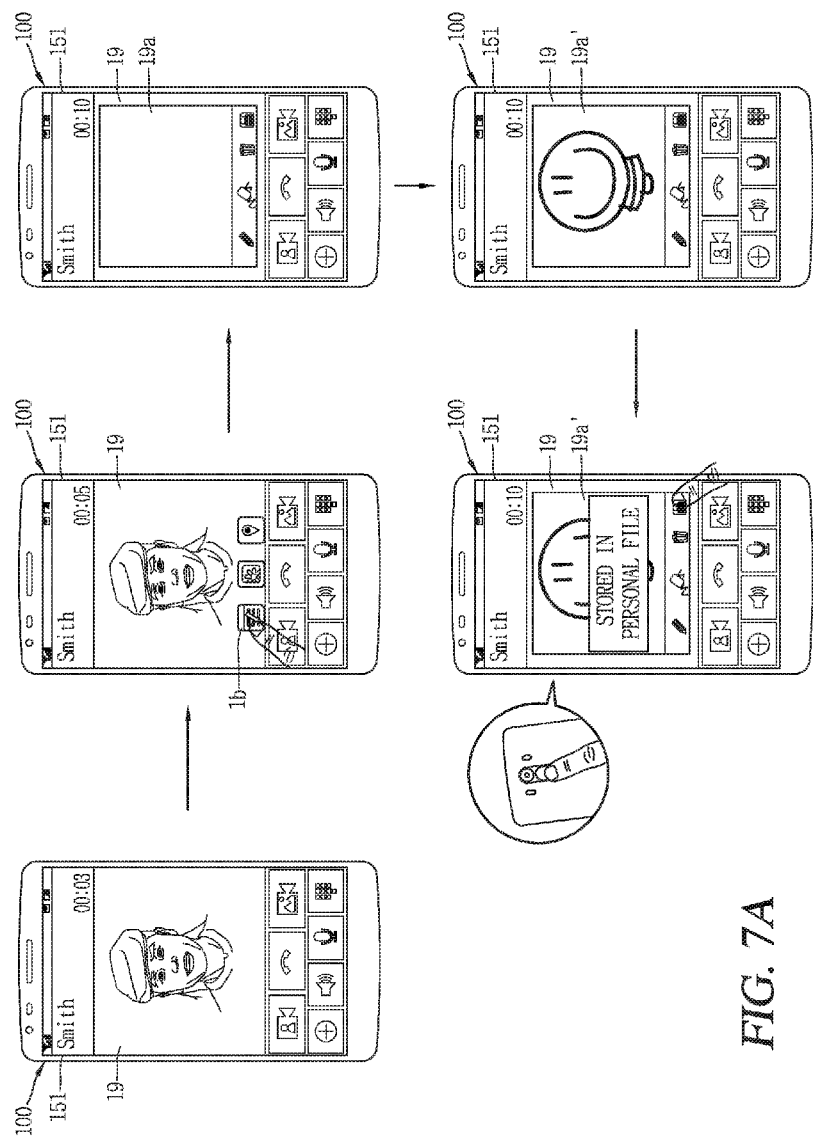
FIGS. 7A and 7B are views illustrating an embodiment related to utilization of biometric information associated with a specific control command while specific function is being executed.
Figure 7B:
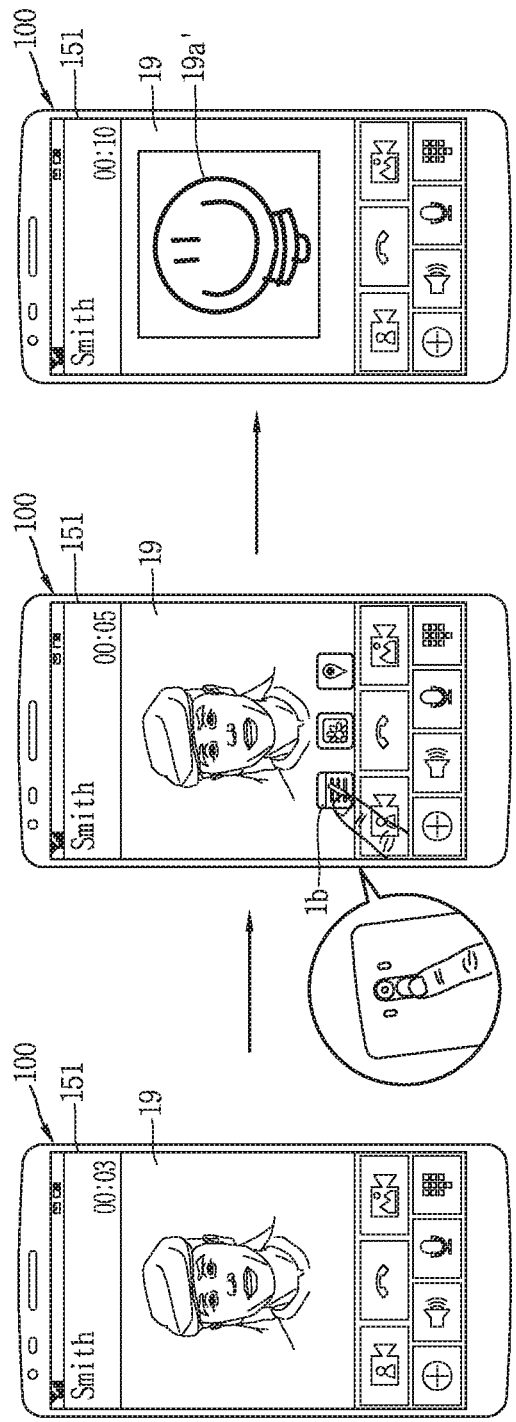

FIGS. 7A and 7B are views illustrating an embodiment related to utilization of biometric information associated with a specific control command while specific function is being executed.

First, referring to FIG. 7A, in a state in which an execution screen 19 corresponding to a specific function (for example, a video call function) is output on the touch screen 151, an input for executing a different function may be applied to an icon 1b corresponding to the different function. Also, as illustrated in a third drawing of FIG. 7A, an execution screen 19a according to execution of the different function may be output on the touch screen 151.

Also, as illustrated in a fourth drawing of FIG. 7A, specific visual information 19a' is formed on the basis of a user input to the execution screen 19a of the different function, and as illustrated in a fifth drawing of FIG. 7A, a specific control command may be input to the touch screen 151. The specific control command may be a control command for storing the specific visual information 19a' and may be input together with the biometric information.

In this case, the control unit 180 may store the specific control command by associating it with the biometric information. Thereafter, as illustrated in FIG. 7B, in a state in which the specific function is executed again and screen information 19 corresponding to the specific function is output, a touch for executing the different one function and the biometric information may be input.

That is, as illustrated in a second drawing of FIG. 7B, the biometric information may be sensed through a specific region of the main body of the mobile terminal 100 together with a touch applied to the icon 1b corresponding to the different one function. The control unit 180 may determine whether there is a specific control command associated with the biometric information sensed while the touch is applied.

In a case in which the biometric information is biometric information associated with the specific control command, the information (for example, the specific visual information 19a') associated with the specific control command may be output as additional information. Thus, as illustrated in a third drawing of FIG. 7B, the specific visual information 19a' may be output as the additional information on the screen information 19.

In this manner, in a case in which the user inputs the specific control command and the biometric information in an associated manner while a specific function is being executed, the user may conveniently immediately output his or her desired information by inputting the biometric information when the specific function is executed again.

Meanwhile, in another example, the additional information may be execution information according to execution of a preset function in the fingerprint information.

Figure 8A:
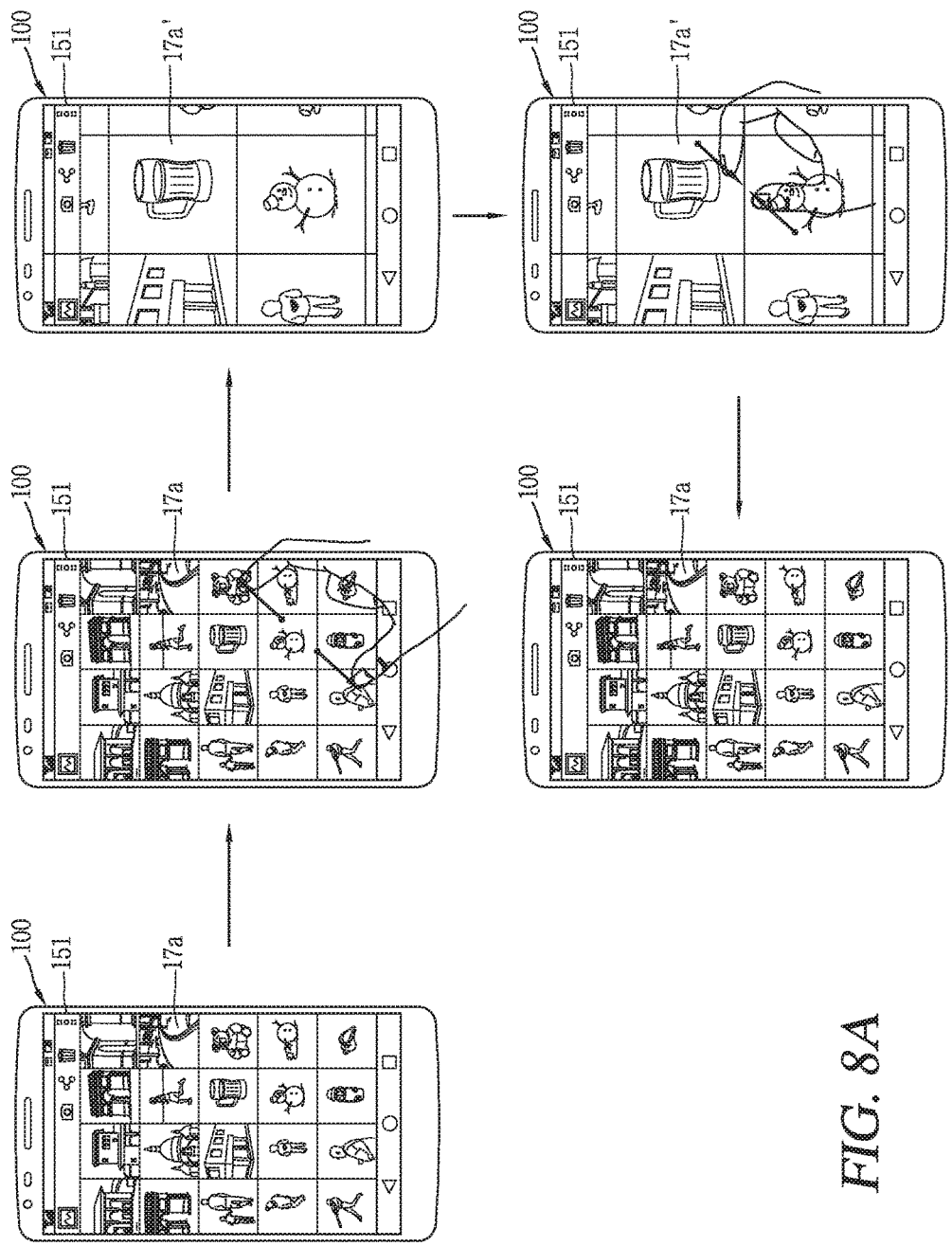
FIGS. 8A and 8B are vies illustrating an embodiment in which additional information is output on touch and fingerprint information according to execution of a preset function.
Figure 8B:
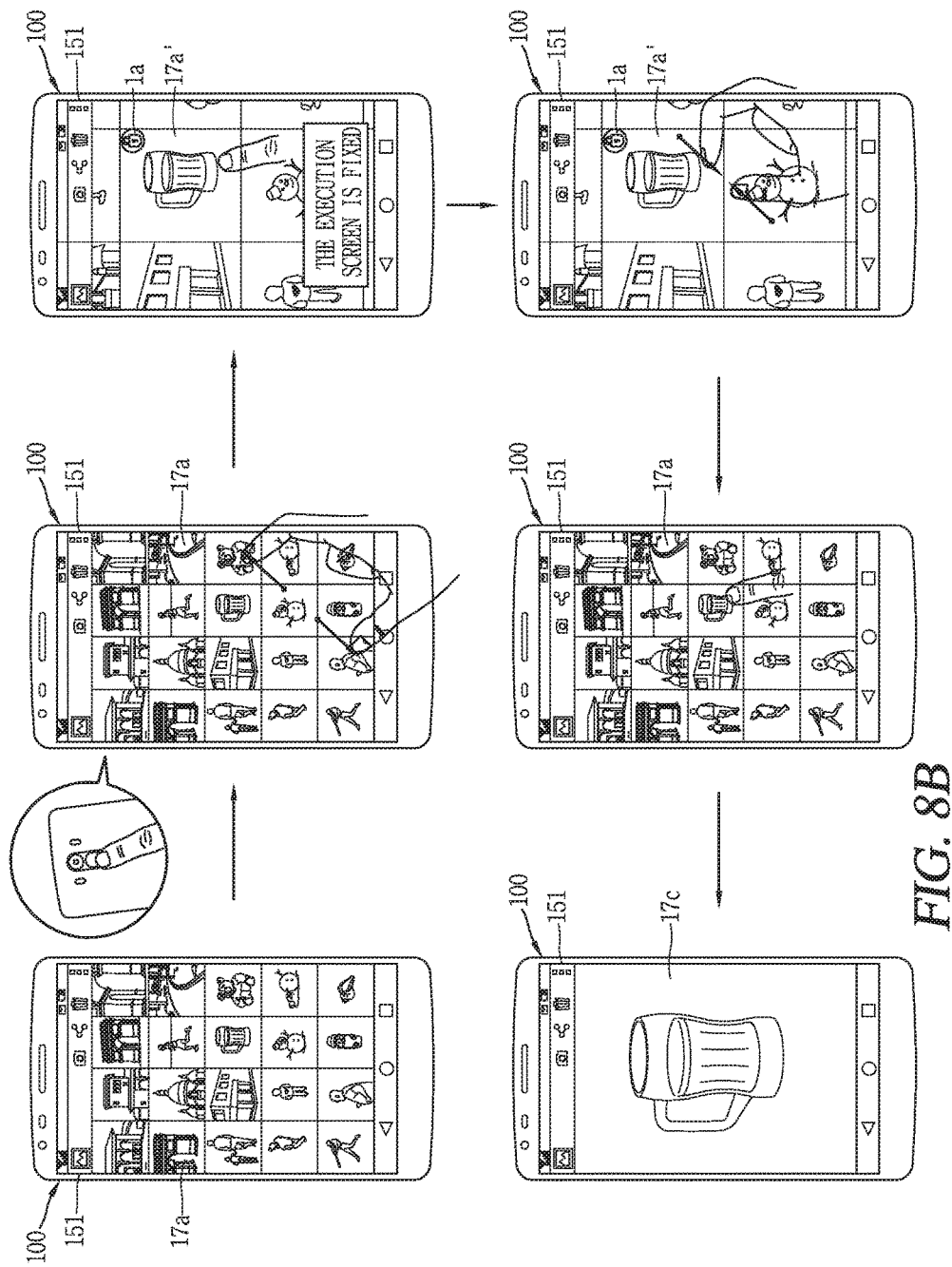

FIGS. 8A and 8B are vies illustrating an embodiment in which additional information is output on touch and fingerprint information according to execution of a preset function.

First, referring to FIG. 8A, in a state in which an execution screen 17a of a gallery application is output on the touch screen 151, when a pinch-out touch (is applied as illustrated in a second drawing of FIG. 8A, at least a portion of the execution screen 17a may be magnified as illustrated in a third drawing of FIG. 8A. Also, when a pinch-in touch is applied as illustrated in a fourth drawing of FIG. 8A, the magnified execution screen 17a' may be changed to a reduced execution screen 17a as illustrated in a fifth drawing of FIG. 8A.

On the other hand, when a pinch-out touch is applied to the execution screen 17a while fingerprint information is sensed as illustrated in a second drawing of FIG. 8B, the control unit 180 may execute a function previously set in the fingerprint information, while changing the execution screen 17a on the basis of the pinch-out touch. For example, in a case in which a function previously set in the fingerprint information is a lock function, execution information 1a according to the execution of the lock function may be output in one region of the magnified execution screen 17a', as additional information.

In this state, even though a touch is applied to the touch screen 151 as illustrated in a third drawing of FIG. 8B, reception of a control command on the basis of the touch may be limited. Thereafter, when a pinch-in touch is applied in a state in which the fingerprint information is sensed, the control unit 180 may switch the magnified execution screen 17a' to the execution screen 17a and release the lock function as illustrated in a fifth drawing of FIG. 8B.

Thus, on the basis of a touch applied to the touch screen 151 as illustrated in a fifth drawing of FIG. 8B, a function corresponding to the touch may be executed as illustrated in a sixth drawing of FIG. 8B.

In this manner, the mobile terminal according to an embodiment of the present disclosure may provide user convenience that, after one function corresponding to the fingerprint information is set in advance, the one function may be immediately executed on the basis of sensing of the fingerprint information.

In the mobile terminal according to an embodiment of the present disclosure, in addition to changing of screen information corresponding to a specific function in response to a touch applied in a state in which the screen information is output, in a case in which the touch is applied together with user's biometric information, additional information related to the specific function may be provided. Also, since the additional information is information reflecting a usage pattern of the user or personal information of the user formed in relation to the specific function, the user may quickly access information that he or she wants to use by simply inputting biometric information additionally, while executing the specific function, and here, several stages may be omitted.

The present invention described above may be implemented as a computer-readable code in a medium in which a program is recorded. The computer-readable medium includes any type of recording device in which data that can be read by a computer system is stored. The computer-readable medium may be, for example, a hard disk drive (HDD), a solid state disk (SSD), a silicon disk drive (SDD), a ROM, a RAM, a CD-ROM, a magnetic tape, a floppy disk, an optical data storage device, and the like. The computer-readable medium also includes implementations in the form of carrier waves (e.g., transmission via the Internet). Also, the computer may include the control unit 180 of the terminal. Thus, the foregoing detailed description should not be interpreted limitedly in every aspect and should be considered to be illustrative. The scope of the present invention should be determined by reasonable interpretations of the attached claims and every modification within the equivalent range are included in the scope of the present invention.

The foregoing embodiments and advantages are merely exemplary and are not to be considered as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
    a touch screen capable of outputting screen information;
    a sensor capable of sensing biometric information of a user; and
    a controller capable of controlling the touch screen and the sensor and configured to cause the touch screen to:
        display first information corresponding to a specific function; and
        display one of second information or third information related to the specific function in response to a touch input based on whether the biometric information is sensed while the touch input is received, the touch input received via the touch screen while the first information is displayed and the third information is displayed when the biometric information is sensed,
    wherein the third information is related to at least one of usage pattern information with regard to execution of the specific function or preset personal information associated with the user.

2. The mobile terminal of claim 1, wherein the second information is displayed without sensing the biometric information.

3. The mobile terminal of claim 1, wherein the usage pattern information includes at least one of:
   information regarding a number of times and a length of period that a sub-menu associated with the specific function has been used;
   information regarding a change pattern of information that is displayed while the specific function is executed; or
   information regarding a different function that is executed together with the specific function while the specific function is executed.

4. The mobile terminal of claim 1, wherein:
   the biometric information includes fingerprint information; and
   the fingerprint information is at least one of:
      fingerprint information corresponding to a finger used to apply the touch input; or
      fingerprint information corresponding to a finger that is in contact with a designated area of the mobile terminal.

5. The mobile terminal of claim 4, wherein the controller is further configured to monitor whether the fingerprint information corresponding to the finger that is in contact with the designated area of the mobile terminal is continuously sensed via the sensor while the third information is displayed.

6. The mobile terminal of claim 5, wherein the controller is further configured to cause the touch screen to:
   maintain the displaying of the third information while the fingerprint information corresponding to the finger that is in contact with the designated area of the mobile terminal is continuously sensed; and
   stop the displaying of the third information when the fingerprint information corresponding to the finger that is in contact with the designated area of the mobile terminal is no longer sensed.

7. The mobile terminal of claim 4, wherein the controller is further configured to:
   recognize both the fingerprint information corresponding to the finger used to apply the touch input and the fingerprint information corresponding to the finger that is in contact with the designated area of the mobile terminal; and
   cause the touch screen to display the third information at an area of the touch screen to which the touch input is received.

8. The mobile terminal of claim 1, wherein the controller is further configured to:
   determine whether the biometric information sensed by the sensor matches preset biometric information; and
   cause the touch screen to display the third information differently based on a result of the determination.

9. The mobile terminal of claim 8, wherein the controller is further configured to cause the touch screen to:
   display preset personal information associated with the user as the third information when the sensed biometric information matches the preset biometric information; and
   display usage pattern information with regard to execution of the specific function as the third information when the sensed biometric information does not match the preset biometric information.

10. The mobile terminal of claim 8, wherein the controller is further configured to cause the touch screen to:
    display first usage pattern information with regard to execution of the specific function when the sensed biometric information matches the preset biometric information; and
    display second usage pattern information with regard to execution of the specific function when the sensed biometric information does not match the preset biometric information.

11. The mobile terminal of claim 10, wherein:
    the first usage pattern information and the second usage pattern information are generated based on information regarding a different function that is executed concurrently with the specific function;
    the first usage pattern information is execution information according to execution of the different function; and
    the second usage pattern information is list information regarding the different function.

12. The mobile terminal of claim 1, wherein the controller is further configured to:
    determine whether the sensed biometric information matches preset biometric information to display the third information; and
    cause the touch screen to enter a locked state in which reception of a touch input via the touch screen is restricted when the sensed biometric information does not match the preset biometric information.

13. The mobile terminal of claim 12, wherein the controller is further configured to:
    determine whether follow-up biometric information sensed by the sensor matches the preset biometric information;
    cause the touch screen to display the third information when the sensed follow-up biometric information matches the preset biometric information; and
    cause the touch screen to enter a deactivated state in which lighting of the touch screen is turned off when the sensed follow-up biometric information does not match the preset biometric information.

14. The mobile terminal of claim 1, further comprising a memory, wherein the controller is further configured to:
    recognize biometric information sensed by the sensor along with a specific touch input received via the touch screen while specific information is displayed via the touch screen; and
    cause the memory to store the specific information in association with the recognized specific touch input and biometric information.

15. The mobile terminal of claim 14, wherein the controller is further configured to:
    recognize the sensed biometric information as the biometric information associated with the stored specific information; and
    cause the touch screen to display the specific information as the third information in response to the biometric information that is sensed while the touch input is received.

16. A method for controlling a mobile terminal, the method comprising:
    displaying first information corresponding to a specific function on a touch screen;
    displaying one of second information or third information related to the specific function in response to a touch input based on whether biometric information of a user is sensed by a sensor while the touch input is received, the touch input received while the first information is displayed and the third information displayed when the biometric information is sensed by the sensor, wherein the third information is related to at least one of usage pattern information with regard to execution of the specific function or preset personal information associated with the user.

17. The method of claim 16, wherein the second information is displayed without sensing the biometric information.

18. The method of claim 16, wherein the usage pattern information includes at least one of:

information regarding a number of times and a length of period that a sub-menu associated with the specific function has been used;

information regarding a change pattern of information that is displayed while the specific function is executed; or information regarding a different function that is executed together with the specific function while the specific function is executed.

19. The method of claim 16, wherein:

the biometric information includes fingerprint information; and the fingerprint information is at least one of:

fingerprint information corresponding to a finger used to apply the touch input; or fingerprint information corresponding to a finger that is in contact with a designated area of the mobile terminal.

20. The method of claim 19, further comprising:

monitoring whether the fingerprint information corresponding to the finger that is in contact with the designated area of the mobile terminal is continuously sensed via the sensor while the third information is displayed; and stopping the displaying of the third information when the fingerprint information corresponding to the finger that is in contact with the designated area of the mobile terminal is no longer sensed.

* * * * *